US011818401B2

(12) United States Patent
Tourapis et al.

(10) Patent No.: US 11,818,401 B2
(45) Date of Patent: *Nov. 14, 2023

(54) POINT CLOUD GEOMETRY COMPRESSION USING OCTREES AND BINARY ARITHMETIC ENCODING WITH ADAPTIVE LOOK-UP TABLES

(71) Applicant: Apple Inc., Cupertino, CA (US)

(72) Inventors: Alexandros Tourapis, Los Gatos, CA (US); Jungsun Kim, San Jose, CA (US); Valery G. Valentin, San Jose, CA (US); Fabrice A. Robinet, Sunnyvale, CA (US); Yeping Su, Cupertino, CA (US); Khaled Mammou, Vancouver (CA)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/718,647

(22) Filed: Apr. 12, 2022

(65) Prior Publication Data

US 2022/0239956 A1 Jul. 28, 2022

Related U.S. Application Data

(63) Continuation of application No. 17/067,458, filed on Oct. 9, 2020, now Pat. No. 11,363,309, which is a (Continued)

(51) Int. Cl.
*H04N 19/96* (2014.01)
*G06T 9/00* (2006.01)
(Continued)

(52) U.S. Cl.
CPC ............... *H04N 19/96* (2014.11); *G06T 9/00* (2013.01); *G06T 17/005* (2013.01); *H04N 19/176* (2014.11); *H04N 19/91* (2014.11)

(58) Field of Classification Search
CPC .............................. G06T 7/005; H04N 19/00
See application file for complete search history.

(56) References Cited

U.S. PATENT DOCUMENTS

| 5,793,371 A | 8/1998 | Deering |
| 5,842,004 A | 11/1998 | Deering |

(Continued)

FOREIGN PATENT DOCUMENTS

| CA | 309618 | 10/2019 |
| CN | 101198945 | 6/2008 |

(Continued)

OTHER PUBLICATIONS

Pragyana K. Mishra, "Image and Depth Coherent Surface Description", Doctoral dissertation, Carnegie Mellon University, The Robotics Institute, Mar. 2005, pp. 1-152.

(Continued)

*Primary Examiner* — Kyle M Lotfi
(74) *Attorney, Agent, or Firm* — Alexander A. Knapp; Kowert, Hood, Munyon, Rankin & Goetzel, P.C.

(57) ABSTRACT

An encoder is configured to compress point cloud geometry information using an octree geometric compression technique that utilizes a binary arithmetic encoder, a look-ahead table, a cache, and a context selection process, wherein encoding contexts are selected based, at least in part, on neighborhood configurations. In a similar manner, a decoder is configured to decode compressed point cloud geometry information utilizing a binary arithmetic encoder, a look-ahead table, a cache, and a context selection process.

20 Claims, 15 Drawing Sheets

Related U.S. Application Data continuation of application No. 16/449,171, filed on Jun. 21, 2019, now Pat. No. 10,805,646.

(60) Provisional application No. 62/689,021, filed on Jun. 22, 2018.

(51) Int. Cl.
*H04N 19/176* (2014.01)
*H04N 19/91* (2014.01)
*G06T 17/00* (2006.01)

(56) References Cited

U.S. PATENT DOCUMENTS

| | | |
|---|---|---|
| 5,867,167 A | 2/1999 | Deering |
| 5,870,094 A | 2/1999 | Deering |
| 5,905,502 A | 5/1999 | Deering |
| 5,933,153 A | 8/1999 | Deering |
| 6,018,353 A | 1/2000 | Deering |
| 6,028,610 A | 2/2000 | Deering |
| 6,088,034 A | 7/2000 | Deering |
| 6,188,796 B1 | 2/2001 | Kadono |
| 6,215,500 B1 | 4/2001 | Deering |
| 6,239,805 B1 | 5/2001 | Deering |
| 6,256,041 B1 | 7/2001 | Deering |
| 6,307,557 B1 | 10/2001 | Deering |
| 6,429,867 B1 | 8/2002 | Deering |
| 6,459,428 B1 | 10/2002 | Burk et al. |
| 6,459,429 B1 | 10/2002 | Deering |
| 6,476,803 B1 | 11/2002 | Zhang |
| 6,522,326 B1 | 2/2003 | Deering |
| 6,522,327 B2 | 2/2003 | Deering |
| 6,525,722 B1 | 2/2003 | Deering |
| 6,525,725 B1 | 2/2003 | Deering |
| 6,531,012 B2 | 3/2003 | Ishiyama |
| 6,559,842 B1 | 5/2003 | Deering |
| 6,603,470 B1 | 8/2003 | Deering |
| 6,628,277 B1 | 9/2003 | Deering |
| 6,747,644 B1 | 6/2004 | Deering |
| 6,858,826 B2 | 2/2005 | Mueller et al. |
| 7,071,935 B1 | 7/2006 | Deering |
| 7,110,617 B2 | 9/2006 | Zhang et al. |
| 7,215,810 B2 | 5/2007 | Kaufman et al. |
| 7,373,473 B2 | 5/2008 | Bukowski et al. |
| 7,737,985 B2 | 6/2010 | Torzewski et al. |
| 7,961,934 B2 | 6/2011 | Thrun et al. |
| 8,022,951 B2 | 9/2011 | Zhirkov et al. |
| 8,040,355 B2 | 10/2011 | Burley |
| 8,055,070 B2 | 11/2011 | Bassi et al. |
| 8,264,549 B2 | 9/2012 | Tokiwa et al. |
| 8,315,425 B2 | 11/2012 | Appel |
| 8,411,932 B2 | 4/2013 | Liu et al. |
| 8,520,740 B2 | 8/2013 | Flachs |
| 8,566,736 B1 | 10/2013 | Jacob |
| 8,643,515 B2 | 2/2014 | Cideciyan |
| 8,718,405 B2 | 5/2014 | Fujiki |
| 8,780,112 B2 | 7/2014 | Kontkanen et al. |
| 8,805,097 B2 | 8/2014 | Ahn et al. |
| 8,884,953 B2 | 11/2014 | Chen et al. |
| 8,996,228 B1 | 3/2015 | Ferguson |
| 9,064,311 B2 | 6/2015 | Mammou et al. |
| 9,064,331 B2 | 6/2015 | Yamashita |
| 9,117,105 B2 | 8/2015 | Da |
| 9,171,383 B2 | 10/2015 | Ahn et al. |
| 9,191,670 B2 | 11/2015 | Karczewicz |
| 9,199,641 B2 | 12/2015 | Ferguson et al. |
| 9,214,042 B2 | 12/2015 | Cai et al. |
| 9,223,765 B1 | 12/2015 | Alakuijala |
| 9,234,618 B1 | 1/2016 | Zhu et al. |
| 9,256,980 B2 | 2/2016 | Kirk |
| 9,292,961 B1 | 3/2016 | Korchev |
| 9,300,321 B2 | 3/2016 | Zalik et al. |
| 9,317,965 B2 | 4/2016 | Krishnaswamy et al. |
| 9,412,040 B2 | 8/2016 | Feng |
| 9,424,672 B2 | 8/2016 | Zavodny |
| 9,430,837 B2 | 8/2016 | Fujiki |
| 9,530,225 B1 | 12/2016 | Nieves |
| 9,532,056 B2 | 12/2016 | Jiang et al. |
| 9,613,388 B2 | 4/2017 | Loss |
| 9,633,146 B2 | 4/2017 | Plummer et al. |
| 9,678,963 B2 | 6/2017 | Hernandez Londono et al. |
| 9,729,169 B2 | 8/2017 | Kalevo |
| 9,734,595 B2 | 8/2017 | Lukac et al. |
| 9,753,124 B2 | 9/2017 | Hayes |
| 9,787,321 B1 | 10/2017 | Hemmer et al. |
| 9,800,766 B2 | 10/2017 | Tsuji |
| 9,836,483 B1 | 12/2017 | Hickman |
| 9,972,129 B2 | 5/2018 | Michel et al. |
| 10,089,312 B2 | 10/2018 | Tremblay et al. |
| 10,108,867 B1 | 10/2018 | Vallespi-Gonzalez |
| 10,223,810 B2 | 3/2019 | Chou et al. |
| 10,259,164 B2 | 4/2019 | Bader |
| 10,277,248 B2 | 4/2019 | Lee |
| 10,372,728 B2 | 8/2019 | Horhammer et al. |
| 10,395,419 B1 | 8/2019 | Godzaridis |
| 10,462,485 B2 | 10/2019 | Mammou et al. |
| 10,467,756 B2 | 11/2019 | Arlinsky et al. |
| 10,510,148 B2 | 12/2019 | Qui |
| 10,546,415 B2 | 1/2020 | Petkov |
| 10,559,111 B2 | 2/2020 | Sachs |
| 10,587,286 B1 | 3/2020 | Flynn |
| 10,607,373 B2 | 3/2020 | Mammou et al. |
| 10,659,816 B2 | 5/2020 | Mammou et al. |
| 10,699,444 B2 | 6/2020 | Mammou et al. |
| 10,715,618 B2 | 7/2020 | Bhaskar |
| 10,762,667 B2 | 9/2020 | Mekuria |
| 10,783,668 B2 | 9/2020 | Sinharoy et al. |
| 10,789,733 B2 | 9/2020 | Mammou et al. |
| 10,805,646 B2 | 10/2020 | Tourapis et al. |
| 10,861,196 B2 | 12/2020 | Mammou et al. |
| 10,867,413 B2 | 12/2020 | Mammou et al. |
| 10,869,059 B2 | 12/2020 | Mammou et al. |
| 10,897,269 B2 | 1/2021 | Mammou et al. |
| 10,909,725 B2 | 2/2021 | Mammou |
| 10,909,726 B2 | 2/2021 | Mammou et al. |
| 10,909,727 B2 | 2/2021 | Mammou et al. |
| 10,911,787 B2 | 2/2021 | Tourapis et al. |
| 10,939,123 B2 | 3/2021 | Li |
| 10,939,129 B2 | 3/2021 | Mammou |
| 10,977,773 B2 | 4/2021 | Hemmer |
| 10,984,541 B2 | 4/2021 | Lim |
| 11,010,907 B1 | 5/2021 | Bagwell |
| 11,010,928 B2 | 5/2021 | Mammou et al. |
| 11,012,713 B2 | 5/2021 | Kim et al. |
| 11,017,566 B1 | 5/2021 | Tourapis et al. |
| 11,017,591 B2 | 5/2021 | Oh |
| 11,044,478 B2 | 6/2021 | Tourapis et al. |
| 11,044,495 B1 | 6/2021 | Dupont |
| 11,095,908 B2 | 8/2021 | Dawar |
| 11,113,845 B2 | 9/2021 | Tourapis et al. |
| 11,122,102 B2 | 9/2021 | Oh |
| 11,122,279 B2 | 9/2021 | Joshi |
| 11,132,818 B2 | 9/2021 | Mammou et al. |
| 11,200,701 B2 | 12/2021 | Aksu |
| 11,202,078 B2 | 12/2021 | Tourapis et al. |
| 11,202,098 B2 | 12/2021 | Mammou et al. |
| 11,212,558 B2 | 12/2021 | Sugio |
| 11,240,532 B2 | 2/2022 | Roimela |
| 11,252,441 B2 | 2/2022 | Tourapis et al. |
| 11,276,203 B2 | 3/2022 | Tourapis et al. |
| 11,284,091 B2 | 3/2022 | Tourapis et al. |
| 11,321,928 B2 | 5/2022 | Melkote Krishnaprasad |
| 11,363,309 B2 | 6/2022 | Tourapis et al. |
| 11,386,524 B2 | 7/2022 | Mammou et al. |
| 11,398,058 B2 | 7/2022 | Zakharchenko |
| 11,398,833 B2 | 7/2022 | Flynn et al. |
| 11,409,998 B2 | 8/2022 | Mammou et al. |
| 11,450,030 B2 | 9/2022 | Mammou |
| 11,450,031 B2 | 9/2022 | Flynn |
| 11,461,935 B2 | 10/2022 | Mammou et al. |
| 11,475,605 B2 | 10/2022 | Flynn |
| 11,494,947 B2 | 11/2022 | Mammou et al. |
| 11,503,367 B2 | 11/2022 | Yea |
| 11,508,095 B2 | 11/2022 | Mammou et al. |

(56) References Cited

U.S. PATENT DOCUMENTS

| | | |
|---|---|---|
| 11,527,018 B2 | 12/2022 | Mammou et al. |
| 11,552,651 B2 | 1/2023 | Mammou et al. |
| 11,615,557 B2 | 3/2023 | Flynn |
| 11,620,768 B2 | 4/2023 | Flynn |
| 2002/0181741 A1 | 12/2002 | Masukura |
| 2003/0066949 A1 | 4/2003 | Mueller et al. |
| 2004/0217956 A1 | 11/2004 | Besl et al. |
| 2006/0133508 A1 | 6/2006 | Sekiguchi |
| 2007/0098283 A1 | 5/2007 | Kim et al. |
| 2007/0160140 A1 | 7/2007 | Fujisawa |
| 2008/0050047 A1 | 2/2008 | Bashyam |
| 2008/0154928 A1 | 6/2008 | Bashyam |
| 2008/0225116 A1 | 9/2008 | Kang |
| 2009/0016598 A1 | 1/2009 | Lojewski |
| 2009/0027412 A1 | 1/2009 | Burley |
| 2009/0087111 A1 | 4/2009 | Noda et al. |
| 2009/0243921 A1 | 10/2009 | Gebben et al. |
| 2009/0285301 A1 | 11/2009 | Kurata |
| 2010/0104157 A1 | 4/2010 | Doyle |
| 2010/0104158 A1 | 4/2010 | Shechtman et al. |
| 2010/0106770 A1 | 4/2010 | Taylor |
| 2010/0166064 A1 | 7/2010 | Perlman |
| 2010/0208807 A1 | 8/2010 | Sikora |
| 2010/0260429 A1 | 10/2010 | Ichinose |
| 2010/0260729 A1 | 10/2010 | Cavato et al. |
| 2010/0296579 A1 | 11/2010 | Panchal et al. |
| 2011/0010400 A1 | 1/2011 | Hayes |
| 2011/0107720 A1 | 5/2011 | Oakey |
| 2011/0142139 A1 | 6/2011 | Cheng |
| 2011/0182477 A1 | 7/2011 | Tamrakar |
| 2012/0124113 A1 | 5/2012 | Zalik et al. |
| 2012/0188344 A1 | 7/2012 | Imai |
| 2012/0246166 A1 | 9/2012 | Krishnaswamy et al. |
| 2012/0300839 A1 | 11/2012 | Sze et al. |
| 2012/0314026 A1 | 12/2012 | Chen et al. |
| 2013/0034150 A1 | 2/2013 | Sadafale |
| 2013/0094777 A1 | 4/2013 | Nomura et al. |
| 2013/0106627 A1 | 5/2013 | Cideciyan |
| 2013/0156101 A1 | 6/2013 | Lu |
| 2013/0195352 A1 | 8/2013 | Nystad |
| 2013/0202197 A1 | 8/2013 | Reeler |
| 2013/0321418 A1 | 12/2013 | Kirk |
| 2013/0322738 A1 | 12/2013 | Oh |
| 2013/0329778 A1 | 12/2013 | Su et al. |
| 2014/0036033 A1 | 2/2014 | Takahashi |
| 2014/0098855 A1 | 4/2014 | Gu et al. |
| 2014/0125671 A1 | 5/2014 | Vorobyov et al. |
| 2014/0176672 A1 | 6/2014 | Lu |
| 2014/0198097 A1 | 7/2014 | Evans |
| 2014/0204088 A1 | 7/2014 | Kirk et al. |
| 2014/0294088 A1 | 10/2014 | Sung et al. |
| 2014/0334557 A1 | 11/2014 | Schierl et al. |
| 2014/0334717 A1 | 11/2014 | Jiang |
| 2015/0003723 A1 | 1/2015 | Huang et al. |
| 2015/0092834 A1 | 4/2015 | Cote et al. |
| 2015/0139560 A1 | 5/2015 | DeWeert et al. |
| 2015/0160450 A1 | 6/2015 | Ou et al. |
| 2015/0186744 A1 | 7/2015 | Nguyen et al. |
| 2015/0268058 A1 | 9/2015 | Samarasekera et al. |
| 2016/0035081 A1 | 2/2016 | Stout et al. |
| 2016/0071312 A1 | 3/2016 | Laine et al. |
| 2016/0086353 A1 | 3/2016 | Lukac et al. |
| 2016/0100151 A1 | 4/2016 | Schaffer et al. |
| 2016/0142697 A1 | 5/2016 | Budagavi et al. |
| 2016/0165241 A1 | 6/2016 | Park |
| 2016/0286215 A1 | 9/2016 | Gamei |
| 2016/0295219 A1 | 10/2016 | Ye et al. |
| 2017/0039765 A1 | 2/2017 | Zhou et al. |
| 2017/0063392 A1 | 3/2017 | Kalevo |
| 2017/0118675 A1 | 4/2017 | Boch |
| 2017/0155402 A1 | 6/2017 | Karkkainen |
| 2017/0155922 A1 | 6/2017 | Yoo |
| 2017/0214943 A1 | 7/2017 | Cohen et al. |
| 2017/0220037 A1 | 8/2017 | Berestov |
| 2017/0243405 A1 | 8/2017 | Brandt et al. |
| 2017/0247120 A1 | 8/2017 | Miller |
| 2017/0249401 A1 | 8/2017 | Eckart et al. |
| 2017/0323617 A1 | 11/2017 | Yang |
| 2017/0337724 A1 | 11/2017 | Gervais et al. |
| 2017/0347100 A1 | 11/2017 | Chou et al. |
| 2017/0347120 A1 | 11/2017 | Chou et al. |
| 2017/0347120 A1 | 11/2017 | Chou et al. |
| 2017/0347122 A1 | 11/2017 | Chou et al. |
| 2017/0358063 A1 | 12/2017 | Chen |
| 2018/0018786 A1 | 1/2018 | Jakubiak |
| 2018/0053324 A1 | 2/2018 | Cohen et al. |
| 2018/0063543 A1 | 3/2018 | Reddy |
| 2018/0075622 A1 | 3/2018 | Tuffreau et al. |
| 2018/0189982 A1 | 7/2018 | Laroche et al. |
| 2018/0192061 A1 | 7/2018 | He |
| 2018/0253867 A1 | 9/2018 | Laroche |
| 2018/0260416 A1 | 9/2018 | Elkaim |
| 2018/0268570 A1 | 9/2018 | Budagavi et al. |
| 2018/0308249 A1 | 10/2018 | Nash et al. |
| 2018/0330504 A1 | 11/2018 | Karlinsky et al. |
| 2018/0338017 A1 | 11/2018 | Mekuria |
| 2018/0342083 A1 | 11/2018 | Onno et al. |
| 2018/0365898 A1 | 12/2018 | Costa |
| 2019/0018730 A1 | 1/2019 | Charamisinau et al. |
| 2019/0020880 A1 | 1/2019 | Wang |
| 2019/0026956 A1 | 1/2019 | Gausebeck |
| 2019/0045157 A1 | 2/2019 | Venshtain |
| 2019/0081638 A1 | 3/2019 | Mammou et al. |
| 2019/0087978 A1 | 3/2019 | Tourapis et al. |
| 2019/0087979 A1 | 3/2019 | Mammou et al. |
| 2019/0088004 A1 | 3/2019 | Lucas et al. |
| 2019/0108655 A1 | 4/2019 | Lasserre |
| 2019/0114504 A1 | 4/2019 | Vosoughi et al. |
| 2019/0114809 A1 | 4/2019 | Vosoughi et al. |
| 2019/0114830 A1 | 4/2019 | Bouazizi |
| 2019/0116257 A1 | 4/2019 | Rhyne |
| 2019/0116357 A1 | 4/2019 | Tian et al. |
| 2019/0122393 A1 | 4/2019 | Sinharoy |
| 2019/0089987 A1 | 5/2019 | Won et al. |
| 2019/0139266 A1 | 5/2019 | Budagavi et al. |
| 2019/0156519 A1 | 5/2019 | Mammou et al. |
| 2019/0156520 A1 | 5/2019 | Mammou et al. |
| 2019/0195616 A1 | 6/2019 | Cao et al. |
| 2019/0197739 A1 | 6/2019 | Sinharoy et al. |
| 2019/0199995 A1 | 6/2019 | Yip et al. |
| 2019/0204076 A1 | 7/2019 | Nishi et al. |
| 2019/0262726 A1 | 8/2019 | Spencer et al. |
| 2019/0289306 A1 | 9/2019 | Zhao |
| 2019/0304139 A1 | 10/2019 | Joshi et al. |
| 2019/0311502 A1 | 10/2019 | Mammou et al. |
| 2019/0313110 A1 | 10/2019 | Mammou et al. |
| 2019/0318488 A1 | 10/2019 | Lim |
| 2019/0318519 A1 | 10/2019 | Graziosi et al. |
| 2019/0340306 A1 | 11/2019 | Harrison |
| 2019/0341930 A1 | 11/2019 | Pavlovic |
| 2019/0371051 A1 | 12/2019 | Dore et al. |
| 2019/0392651 A1 | 12/2019 | Graziosi |
| 2020/0005518 A1 | 1/2020 | Graziosi |
| 2020/0013235 A1 | 1/2020 | Tsai et al. |
| 2020/0020132 A1 | 1/2020 | Sinharoy et al. |
| 2020/0020133 A1 | 1/2020 | Najaf-Zadeh et al. |
| 2020/0021847 A1 | 1/2020 | Kim et al. |
| 2020/0027248 A1 | 1/2020 | Verschaeve |
| 2020/0043220 A1 | 2/2020 | Mishaev |
| 2020/0045344 A1 | 2/2020 | Boyce et al. |
| 2020/0104976 A1 | 4/2020 | Mammou et al. |
| 2020/0105024 A1 | 4/2020 | Mammou et al. |
| 2020/0107022 A1 | 4/2020 | Ahn et al. |
| 2020/0107048 A1 | 4/2020 | Yea |
| 2020/0111237 A1 | 4/2020 | Tourapis et al. |
| 2020/0137399 A1 | 4/2020 | Li et al. |
| 2020/0151913 A1 | 5/2020 | Budagavi |
| 2020/0153885 A1 | 5/2020 | Lee et al. |
| 2020/0195946 A1 | 6/2020 | Choi |
| 2020/0204808 A1 | 6/2020 | Graziosi |
| 2020/0217937 A1 | 7/2020 | Mammou et al. |
| 2020/0219285 A1 | 7/2020 | Faramarzi et al. |
| 2020/0219288 A1 | 7/2020 | Joshi |
| 2020/0219290 A1 | 7/2020 | Tourapis et al. |
| 2020/0228836 A1 | 7/2020 | Schwarz et al. |

(56) References Cited

U.S. PATENT DOCUMENTS

| | | |
|---|---|---|
| 2020/0244993 A1 | 7/2020 | Schwarz et al. |
| 2020/0260063 A1 | 8/2020 | Hannuksela |
| 2020/0273208 A1 | 8/2020 | Mammou et al. |
| 2020/0273258 A1 | 8/2020 | Lasserre et al. |
| 2020/0275129 A1 | 8/2020 | Deshpande |
| 2020/0279435 A1 | 9/2020 | Kuma |
| 2020/0286261 A1 | 9/2020 | Faramarzi et al. |
| 2020/0288171 A1 | 9/2020 | Hannuksela et al. |
| 2020/0294271 A1 | 9/2020 | Ilola |
| 2020/0302571 A1 | 9/2020 | Schwartz |
| 2020/0302578 A1 | 9/2020 | Graziosi |
| 2020/0302621 A1 | 9/2020 | Kong |
| 2020/0302651 A1 | 9/2020 | Flynn |
| 2020/0302655 A1 | 9/2020 | Oh |
| 2020/0359035 A1 | 11/2020 | Chevet |
| 2020/0359053 A1 | 11/2020 | Yano |
| 2020/0366941 A1 | 11/2020 | Sugio et al. |
| 2020/0374559 A1 | 11/2020 | Fleureau et al. |
| 2020/0380765 A1 | 12/2020 | Thudor et al. |
| 2020/0396489 A1 | 12/2020 | Flynn |
| 2020/0413096 A1 | 12/2020 | Zhang |
| 2021/0005006 A1 | 1/2021 | Oh |
| 2021/0006805 A1 | 1/2021 | Urban et al. |
| 2021/0006833 A1 | 1/2021 | Tourapis et al. |
| 2021/0012536 A1 | 1/2021 | Mammou et al. |
| 2021/0012538 A1 | 1/2021 | Wang |
| 2021/0014293 A1 | 1/2021 | Yip |
| 2021/0021869 A1 | 1/2021 | Wang |
| 2021/0027505 A1 | 1/2021 | Yano et al. |
| 2021/0029381 A1 | 1/2021 | Zhang et al. |
| 2021/0056732 A1 | 2/2021 | Han |
| 2021/0074029 A1 | 3/2021 | Fleureau |
| 2021/0084333 A1 | 3/2021 | Zhang |
| 2021/0090301 A1 | 3/2021 | Mammou et al. |
| 2021/0097723 A1 | 4/2021 | Kim et al. |
| 2021/0097725 A1 | 4/2021 | Mammou et al. |
| 2021/0097726 A1 | 4/2021 | Mammou et al. |
| 2021/0099701 A1 | 4/2021 | Tourapis et al. |
| 2021/0103780 A1 | 4/2021 | Mammou et al. |
| 2021/0104014 A1 | 4/2021 | Kolb, V |
| 2021/0104073 A1 | 4/2021 | Yea et al. |
| 2021/0104075 A1 | 4/2021 | Mammou et al. |
| 2021/0105022 A1 | 4/2021 | Flynn et al. |
| 2021/0105493 A1 | 4/2021 | Mammou et al. |
| 2021/0105504 A1 | 4/2021 | Hur et al. |
| 2021/0112281 A1 | 4/2021 | Wang |
| 2021/0119640 A1 | 4/2021 | Mammou et al. |
| 2021/0142522 A1 | 5/2021 | Li |
| 2021/0150765 A1 | 5/2021 | Mammou |
| 2021/0150766 A1 | 5/2021 | Mammou et al. |
| 2021/0150771 A1 | 5/2021 | Huang |
| 2021/0166432 A1 | 6/2021 | Wang |
| 2021/0166436 A1 | 6/2021 | Zhang |
| 2021/0168386 A1 | 6/2021 | Zhang |
| 2021/0183112 A1 | 6/2021 | Mammou et al. |
| 2021/0185331 A1 | 6/2021 | Mammou et al. |
| 2021/0195162 A1 | 6/2021 | Chupeau et al. |
| 2021/0201541 A1 | 7/2021 | Lasserre |
| 2021/0203989 A1 | 7/2021 | Wang |
| 2021/0211724 A1 | 7/2021 | Kim et al. |
| 2021/0217139 A1 | 7/2021 | Yano |
| 2021/0217203 A1 | 7/2021 | Kim et al. |
| 2021/0217206 A1 | 7/2021 | Flynn |
| 2021/0218969 A1 | 7/2021 | Lasserre |
| 2021/0218994 A1 | 7/2021 | Flynn |
| 2021/0233281 A1 | 7/2021 | Wang et al. |
| 2021/0248784 A1 | 8/2021 | Gao |
| 2021/0248785 A1 | 8/2021 | Zhang |
| 2021/0256735 A1 | 8/2021 | Tourapis et al. |
| 2021/0258610 A1 | 8/2021 | Iguchi |
| 2021/0264640 A1 | 8/2021 | Mammou et al. |
| 2021/0264641 A1 | 8/2021 | Iguchi |
| 2021/0266597 A1 | 8/2021 | Kim et al. |
| 2021/0281874 A1 | 9/2021 | Lasserre |
| 2021/0295569 A1 | 9/2021 | Sugio |
| 2021/0319593 A1 | 10/2021 | Flynn |
| 2021/0383576 A1 | 12/2021 | Olivier |
| 2021/0398352 A1 | 12/2021 | Tokumo |
| 2021/0400280 A1 | 12/2021 | Zaghetto |
| 2021/0407147 A1 | 12/2021 | Flynn |
| 2021/0407148 A1 | 12/2021 | Flynn |
| 2022/0020211 A1 | 1/2022 | Vytyaz |
| 2022/0030258 A1 | 1/2022 | Zhang |
| 2022/0070493 A1 | 3/2022 | Mammou |
| 2022/0084164 A1 | 3/2022 | Hur |
| 2022/0101555 A1 | 3/2022 | Zhang |
| 2022/0116659 A1 | 4/2022 | Pesonen |
| 2022/0164994 A1 | 5/2022 | Joshi |
| 2022/0239956 A1 | 7/2022 | Tourapis et al. |
| 2022/0405533 A1 | 12/2022 | Mammou et al. |
| 2023/0005188 A1 | 1/2023 | Tourapis et al. |
| 2023/0169658 A1 | 6/2023 | Rhodes |

FOREIGN PATENT DOCUMENTS

| | | |
|---|---|---|
| CN | 10230618 | 1/2012 |
| CN | 102428698 | 4/2012 |
| CN | 102630011 | 8/2012 |
| CN | 103329524 | 9/2013 |
| CN | 103944580 | 7/2014 |
| CN | 104156972 | 11/2014 |
| CN | 104408689 | 3/2015 |
| CN | 105261060 | 1/2016 |
| CN | 105818167 | 8/2016 |
| CN | 106651942 | 5/2017 |
| CN | 106846425 | 6/2017 |
| CN | 107155342 | 9/2017 |
| CN | 108632607 | 10/2018 |
| EP | 1745442 | 1/2007 |
| EP | 2533213 | 12/2012 |
| EP | 3429210 | 1/2019 |
| EP | 3496388 | 6/2019 |
| EP | 3614674 | 2/2020 |
| EP | 3751857 | 12/2020 |
| JP | 2013111948 | 6/2013 |
| WO | 200004506 | 1/2000 |
| WO | 2008129021 | 10/2008 |
| WO | 2013022540 | 2/2013 |
| WO | 2018050725 | 3/2018 |
| WO | 2018094141 | 5/2018 |
| WO | 2019011636 | 1/2019 |
| WO | 2019013430 | 1/2019 |
| WO | 2019076503 | 4/2019 |
| WO | 2019078696 | 4/2019 |
| WO | 2019093834 | 5/2019 |
| WO | 2019129923 | 7/2019 |
| WO | 2019135024 | 7/2019 |
| WO | 2019143545 | 7/2019 |
| WO | 2019194522 | 10/2019 |
| WO | 2019199415 | 10/2019 |
| WO | 20190197708 | 10/2019 |
| WO | 2019069711 | 11/2019 |
| WO | 2020012073 | 1/2020 |
| WO | 2020066680 | 2/2020 |

OTHER PUBLICATIONS

Robert Cohen, "CE 3.2 point-based prediction for point loud compression", dated Apr. 2018, pp. 1-6.

Jang et al., Video-Based Point-Cloud-Compression Standard in MPEG: From Evidence Collection to Committee Draft [Standards in a Nutshell], IEEE Signal Processing Magazine, Apr. 2019.

Ekekrantz, Johan, et al., "Adaptive Cost Function for Pointcloud Registration," arXiv preprint arXiv: 1704.07910 (2017), pp. 1-10.

Vincente Morell, et al., "Geometric 3D point cloud compression", Copyright 2014 Elsevier B.V. All rights reserved, pp. 1-18.

U.S. Appl. No. 17/523,826, filed Nov. 10, 2021, Mammou, et a.

Chou, et al., "Dynamic Polygon Clouds: Representation and Compression for VR/AR", ARXIV ID: 1610.00402, Published Oct. 3, 2016, pp. 1-28.

U.S. Appl. No. 17/804,477, filed May 27, 2022, Khaled Mammou, et al.

(56) References Cited

OTHER PUBLICATIONS

Jingming Dong, "Optimal Visual Representation Engineering and Learning for Computer Vision", Doctoral Dissertation, UCLA, 2017, pp. 1-151.
Khaled Mammou et al, "Working Draft of Point Cloud Coding for Category 2 (Draft 1)", dated Apr. 2018, pp. 1-38.
Khaled Mammou et al , "Input Contribution", dated Oct. 8, 2018, pp. 1-42.
Benjamin Bross et al, "High Effeciency Video Coding (HEVC) Text Specification Draft 8", dated Jul. 23, 2012, pp. 1-86.
JunTaek Park et al, "Non-Overlapping Patch Packing in TMC2 with HEVC-SCC", dated Oct. 8, 2018, pp. 1-6.
Dong Liu, et al., "Three-Dimensional Point-Cloud Plus Patches: Towards Model-Based Image Coding in the Cloud", 2015 IEEE International Conference on Multimedia Big Data, IEEE Computer Society, pp. 395-400.
Cohen Robert A et al, "Point Cloud Attribute Compression Using 3-D Intra Prediction and Shape-Adaptive Transforms", dated Mar. 30, 2016, pp. 141-150.
Tim Golla et al., "Real-time Point Cloud Compression", IROS, 2015, pp. 1-6.
Jae-Kyun, et al., "Large-Scale 3D Point Cloud Compression Using Adaptive Radial Distance Prediction in Hybrid Coordinate Domains", IEEE Journal of Selected Topics in Signal Processing, vol. 9, No. 3, Apr. 2015, pp. 1-14.
R. Mekuria, et al., "Design, Implementation and Evaluation of a Point Cloud Codec for Tele-Immersive Video", IEEE Transactions on Circuits and Systems for Video Technology 27.4, 2017, pp. 1-14.
David Flynn, "International Organisation for Standardisation Organisation International De Normalisation ISO/IEC JTC1/SC29/WG11 Coding of Moving Pictures and Audio", dated Apr. 2020. pp. 1-9.
Miska M. Hannuksela, "On Slices and Tiles", JVET Meeting, The Joint Video Exploration Team of ISO/IEC, Sep. 25, 2018, pp. 1-3.
""""G-PCC Future Enchancements"", MPEG Metting, Oct. 7-11, 2019, (Motion Picture Expert Group of ISO/IECJTC1/SC29-WG11), Retrieved from http://phenix.int-evry.fr/mpeg/doc_end_user/documents/128_Geneva/wg11/w18887.zipw18887/w18887 on Dec. 23, 2019, pp. 1-30".
"David Flynn et al., ""G-PCC: A hierarchical geometry slice structure"", MPEG Meeting, Retrieved from http://phenix.intevry.fr/mpeg/doc_end_user/documents/131_Online/wg11/m54677-v1-m54677_vl.zip, Jun. 28, 2020, pp. 1-9".
Bin Lu, et al., ""Massive Point Cloud Space Management Method Based on Octree-Like Encoding"", Arabian Journal forScience Engineering, https://doi.org/10.1007/s13369-019-03968-7, 2019, pp. 1-15.
Wikipedia, ""k-d tree"", Aug. 1, 2019, Retrieved from URL: https://en.wikipedia.org/w.indec.php?title=Kd_tree&oldid=908900837, pp. 1-9.
Ruwen Schnabel et al., "Octree-based Point-Cloud Compression", Eurographics Symposium on Point-Based Graphics, 2006, pp. 1-11.
Yuxue Fan et al., "Point Cloud Compression Based on Hierarchical Point Clustering", Signal and Information Processing Association Annual Summit and Conference (APSIPA), IEEE, 2013, pp. 1-7.
Sebastian Schwarz, et al., "Emerging MPEG Standards for Point Cloud Compression", IEEE Journal on Emerging and Selected Topics In Circuits and Systems, vol. 9, No. 1, Mar. 2019, pp. 133-148.
Li Li, et al., Efficient Projected Frame Padding for Video-based Point Cloud Compression, IEEE Transactions on Multimedia, doi: 10.100/TMM.2020.3016894, 2020, pp. 1-14.
Lujia Wang, et al., "Point-cloud Compression Using Data Independent Method—A 3D Discrete Cosine Transform Approach", in Proceedings of the 2017 IEEE International Conference on Information and Automation (ICIA), Jul. 2017, pp. 1-6.
Ismael Daribo, et al., "Efficient Rate-Distortion Compression on Dynamic Point Cloud for Grid-Pattern-Based 3D Scanning Systems", 3D Research 3.1, Springer, 2012, pp. 1-9.

Yiting Shao, et al., "Attribute Compression of 3D Point Clouds Using Laplacian Sparsity Optimized Graph Transform", 2017 IEEE Visual Communications and Image Processing (VCIP), IEEE, 2017, p. 1-4.
Siheng Chen, et al., "Fast Resampling of 3D Point Clouds via Graphs", arX1v:1702.06397v1, Feb. 11, 2017, pp. 1-15.
Nahid Sheikhi Pour, "Improvements for Projection-Based Point Cloud Compression", MS Thesis, 2018, pp. 1-75.
Robert Skupin, et al., "Multiview Point Cloud Filtering for Spatiotemporal Consistency", VISAPP 2014—International Conference on Computer Vision Theory and Applications, 2014, pp. 531-538.
Kammert, et al., "Real-time Compression of Point Cloud Streams", 2012 IEEE International Conference on Robotics and Automation, RiverCentre, Saint Paul, Minnesota, USA, May 14-18, 2012, pp. 778-785.
Garcia, et al., "Context-Based Octree Coding for Point Cloud Video", 2017 IEEE International Conference on Image Processing (ICIP), 2017, pp. 1412-1416.
Stefan Gumhold et al, "Predictive Point-Cloud Compression", dated Jul. 31, 2005, pp. 1-7.
Pierre-Marie Gandoin et al, "Progressive Lossless Compression of Arbitrary Simplicial Complexes", Dated Jul. 1, 2002, pp. 1-8.
U.S. Appl. No. 17/691,754, filed Mar. 10, 2022, Khaled Mammou.
Tilo Ochotta et al, "Image-Based Surface Compression", dated Sep. 1, 2008, pp. 1647-1663.
W. Zhu, et al., "Lossless point cloud geometry compression via binary tree partition and intra prediction," 2017 IEEE 19th International Workshop on Multimedia Signal Prcoessing (MMSP), 2017, pp. 1-6, doi: 1.1109/MMSP.2017.8122226 (Year 2017).
Keming Cao, et al., "Visual Quality of Compressed Mesh and Point Cloud Sequences", IEEE Access, vol. 8, 2020. pp. 171203-171217.
Merry et al., Compression of dense and regular point clouds, Proceedings of the 4th international conference on Computer graphics, virtual reality, visualisation and interaction in Africa (pp. 15-20). ACM. (Jan. 2006).
Lustosa et al., Database system support of simulation data, Proceedings of the VLDB Endowment 9.13 (2016): pp. 1329-1340.
Hao Liu, et al., "A Comprehensive Study and Comparison of Core Technologies for MPEG 3D Point Cloud Compression", arXiv: 1912.09674v1, Dec. 20, 2019, pp. 1-17.
Styliani Psomadaki, "Using a Space Filing Curve for the Management of Dynamic Point Cloud Data in a Relational DBMS", Nov. 2016, pp. 1-158.
Remi Cura et al, "Implicit Lod for Processing and Classification in Point Cloud Servers", dated Mar. 4, 2016, pp. 1-18.
Yan Huang et al, Octree-Based Progressive Geometry Coding of Point Clouds, dated Jan. 1, 2006, pp. 1-10.
Khaled Mammou, et al., "G-PCC codec description v1", International Organisation for Standardisation, ISO/IEC JTC1/SC29/WG11, Oct. 2018, pp. 1-32.
"V-PCC Codec Description", 127. MPEG Meeting; Jul. 8, 2019-Jul. 12, 2019; Gothenburg; (Motion Picture Expert Group or ISO/IEC JTC1/SC29/WG), dated Sep. 25, 2019.
G-PPC Codec Description, 127. MPEG Meeting; Jul. 8, 2019-Jul. 12, 2019; Gothenburg; (Motion Picture Expert Group or ISO/IEC JTC1/SC29/WG),dated Sep. 6, 2019.
Jianqiang Liu et al, "Data-Adaptive Packing Method for Compresssion of Dynamic Point Cloud Sequences", dated Jul. 8, 2019, pp. 904-909.
Jorn Jachalsky et al, "D4.2.1 Scene Analysis with Spatio-Temporal", dated Apr. 30, 2013, pp. 1-60.
Lasserre S et al, "Global Motion Compensation for Point Cloud Compression in TMC3", dated Oct. 3, 2018, pp. 1-28.
D. Graziosi et al, "An overview of ongoing point cloud compression standardization activities: video-based (V-PCC) and geometry-based (G-PCC)" Asipa Transactions on Signal and Information Processing, vol. 9, dated Apr. 30, 2020, pp. 1-17.
"Continuous improvement of study text of ISO-IEC CD 23090-5 Video-Based Point Cloud Compression" dated May 8, 2019, pp. 1-140.
Mehlem D. et al, "Smoothing considerations for V-PCC", dated Oct. 2, 2019, pp. 1-8.

(56) References Cited

OTHER PUBLICATIONS

Flynn D et al, "G-PCC Bypass coding of bypass bins", dated Mar. 21, 2019, pp. 1-3.
Sharman K et al, "CABAC Packet-Based Stream", dated Nov. 18, 2011, pp. 1-6.
Lasserre S et al, "On bypassed bit coding and chunks", dated Apr. 6, 2020, pp. 1-3.
David Flynn et al, "G-pcc low latency bypass bin coding". dated Oct. 3, 2019, pp. 1-4.
Chuan Wang, et al., "Video Vectorization via Tetrahedral Remeshing", IEEE Transactions on Image Processing, vol. 26, No. 4, Apr. 2017, pp. 1833-1844.
Liu Chao, "Research on point cloud data processing and reconstruction," Full-text Database, Feb. 7, 2023.
U.S. Appl. No. 18/063,592, filed Dec. 8, 2022, Khaled Mammou, et al.
U.S. Appl. No. 18/189,099, filed Mar. 23, 2023, Kjungsun Kim, et al.
U.S. Appl. No. 17/157,833, filed Jan. 25, 2021, Khaled Mammou.
U.S. Appl. No. 18/052,803, filed Nov. 4, 2022, Mammou, et al.

```
┌─────────────────────┐
│ Select a first (or  │
│ next) subdivision   │
│ level of the octree │
│ to evaluate         │
│ (e.g. an octree     │
│ level)              │
│         202         │
└──────────┬──────────┘
           ▼
┌─────────────────────┐
│ Subdivide the point │
│ cloud into cubes    │
│ having dimensions   │
│ $(2^{C-L}, 2^{C-L}, 2^{C-L})$, │──┐
│ where L is          │  │
│ incremented for each│  │
│ successive          │  │
│ subdivision level   │  │
│         204         │  │
└──────────┬──────────┘  │
           ▼             │
┌─────────────────────┐  │
│ Determine a set of  │  │
│ non-overlapping     │  │
│ look-ahead cubes for│  │
│ the selected        │  │
│ subdivision level   │  │
│ "L", wherein the    │  │
│ look-ahead cubes    │  │
│ have dimensions     │  │
│ $(2^{H-C+L}, 2^{H-C+L}, 2^{H-C+L})$ │
│         206         │  │
└──────────┬──────────┘  │
           ▼             │
┌─────────────────────┐  │
│ Generate            │  │     ┌─────────────────────┐
│ neighborhood look-up│  │     │ Proceed to encoding │
│ tables for each     │  │     │ occupancy symbols   │
│ look-ahead cube and │  │     │ for the cubes of the│
│ populate the        │  │     │ point cloud at the  │
│ neighborhood look-up│──┼────▶│ selected subdivision│
│ tables with values  │  │     │ level, wherein      │
│ indicating populated│  │     │ particular          │
│ and unpopulated     │  │     │ neighborhood        │
│ cubes within the    │  │     │ encoding contexts   │
│ respective look-    │  │     │ are selected for    │
│ ahead cubes         │  │     │ encoding occupancy  │
│         208         │  │     │ symbols particular  │
└─────────────────────┘  │     │ cubes at the        │
                         │     │ selected subdivision│
                         │     │ level based on the  │
                         │     │ generated           │
                         │     │ neighborhood look-up│
                         │     │ tables              │
                         │     │         210         │
                         │     └─────────────────────┘
```

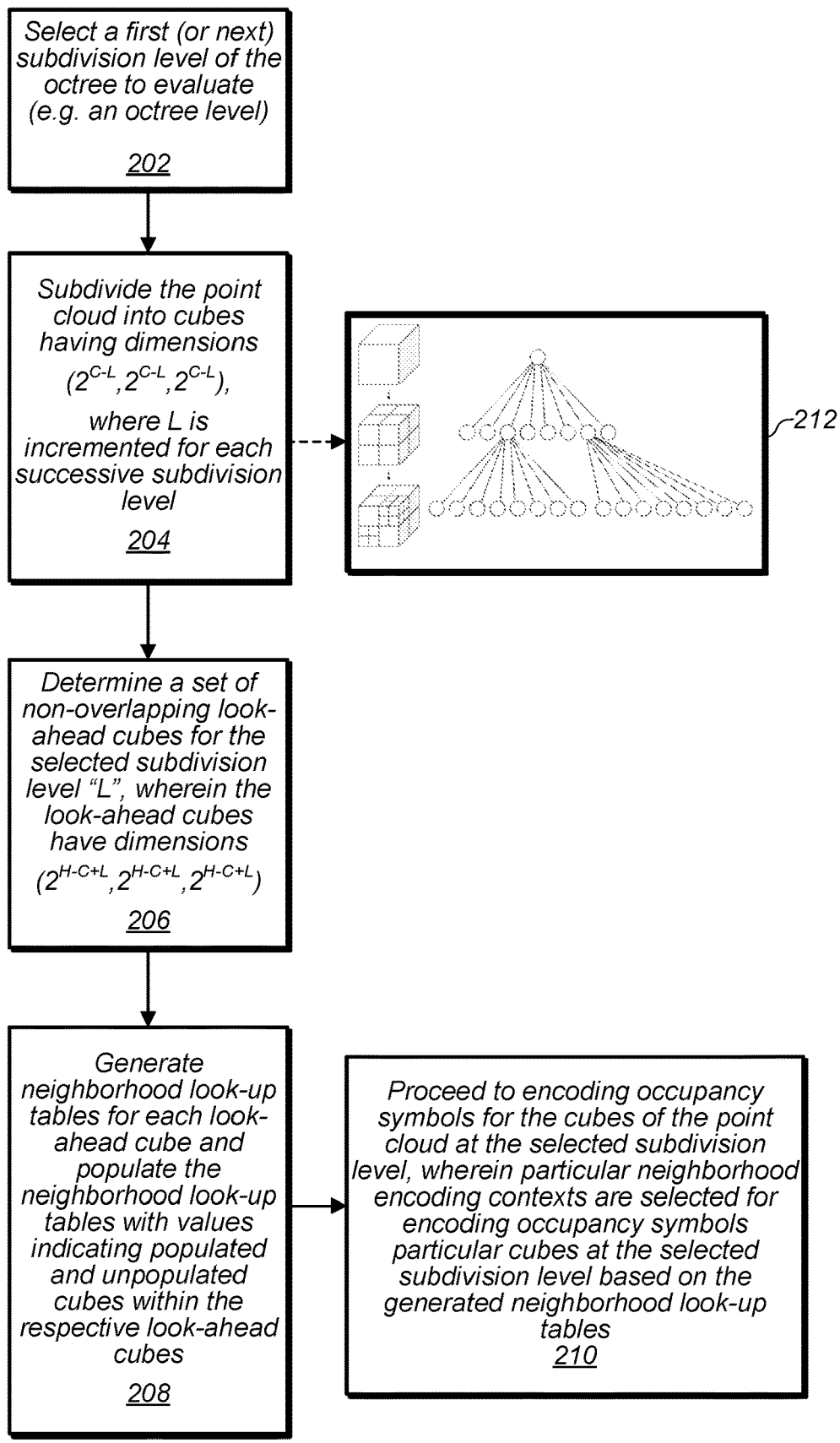

FIG. 2

Determine a neighborhood occupancy configuration for a given cube for which an occupancy symbol is to be encoded based on a neighborhood look-up table including the given cube determined based on a look-ahead cube that includes the given cube
452

Select a particular encoding context for encoding the occupancy symbol for the given cube based on identifying the determined occupancy configuration in an additional neighborhood look-up table comprising index values that map occupancy configurations to neighborhood encoding contexts, where less probable occupancy configurations share a common index value and corresponding neighborhood encoding context in the additional neighborhood look-up table
454

*FIG. 4B*

POINT CLOUD GEOMETRY COMPRESSION USING OCTREES AND BINARY ARITHMETIC ENCODING WITH ADAPTIVE LOOK-UP TABLES

PRIORITY CLAIM

This application is a continuation of U.S. patent application Ser. No. 17/067,458, filed Oct. 9, 2020, which is a continuation of U.S. patent application Ser. No. 16/449,171, filed Jun. 21, 2019, now U.S. Pat. No. 10,805,646, which claims benefit of priority to U.S. Provisional Application Ser. No. 62/689,021, filed Jun. 22, 2018, and which are incorporated herein by reference in their entirety.

BACKGROUND

Technical Field

This disclosure relates generally to compression and decompression of point clouds comprising a plurality of points, each having associated spatial and/or attribute information.

Description of the Related Art

Various types of sensors, such as light detection and ranging (LIDAR) systems, 3-D-cameras, 3-D scanners, etc. may capture data indicating positions of points in three dimensional space, for example positions in the X, Y, and Z planes. Also, such systems may further capture attribute information in addition to spatial information for the respective points, such as color information (e.g. RGB values), intensity attributes, reflectivity attributes, motion related attributes, modality attributes, or various other attributes. In some circumstances, additional attributes may be assigned to the respective points, such as a time-stamp when the point was captured. Points captured by such sensors may make up a "point cloud" comprising a set of points each having associated spatial information and one or more associated attributes. In some circumstances, a point cloud may include thousands of points, hundreds of thousands of points, millions of points, or even more points. Also, in some circumstances, point clouds may be generated, for example in software, as opposed to being captured by one or more sensors. In either case, such point clouds may include large amounts of data and may be costly and time-consuming to store and transmit.

SUMMARY OF EMBODIMENTS

In some embodiments, a system includes one or more sensors configured to capture points that collectively make up a point cloud, wherein each of the points comprises spatial information identifying a spatial location of the respective point and/or attribute information defining one or more attributes associated with the respective point. The system also include an encoder configured to compress the spatial and/or attribute information for the points. The encoder is configured to partition the plurality of points of the point cloud into an octree comprising a plurality of cubes and sub-cubes at different levels of the octree, wherein respective ones of the cubes comprises eight sub-cubes. Additionally, the encoder is configured to, for a set of cubes at a given octree level, determine occupancy symbols indicating occupancy states of the sub-cubes of the cubes at the given octree level, wherein the occupancy symbols indicate occupied and unoccupied ones of the eight sub-cubes of the cubes at the given octree level, and encode the occupancy symbols. To encode the occupancy symbols a first binary information is encoded if a given occupancy symbol being encoded is included in an look-up table for the occupancy symbols, wherein the binary information includes a bit set to indicate the occupancy symbol is in the look-up table and a five-bit value indicating an index value into the look-up table for the given occupancy symbol, wherein the look-up table includes a sub-set of frequently encoded occupancy symbols of a set of possible occupancy symbols for the set of cubes at the given octree level. Also, to encode the occupancy symbols another binary information is encoded if the given occupancy symbol is not included in the look up table, but is included in a cache, wherein the other binary information includes a bit set to indicate the occupancy symbol is included in the cache and a four-bit value indicating an index value into the cache for the given occupancy symbol, wherein the cache includes another sub-set of recently encoded occupancy symbols of the set of possible occupancy symbols for the set of cubes at the given octree level. Furthermore, to encode occupancy symbols a binary representation of the given occupancy symbol is encoded if the given occupancy symbol is not included in the look-up table or the cache, wherein the binary representation includes an eight-bit value defining a particular one of a set of possible occupancy symbols for the given occupancy symbol. For example, because each cube of the octree includes eight sub-cubes, there are $2^8$ (e.g. 256) possible occupancy symbols. However, an index may include fewer occupancy symbols, such as $2^5$ occupancy symbols (e.g. 32 or index values 0-31 for occupancy symbols), and a cache may include even fewer occupancy symbols, such as $2^4$ occupancy symbols (e.g. 16 or index values 0-15 for occupancy symbols).

In some embodiments, a method may include, for an octree of a point cloud comprising a plurality of divisions and subdivisions at different levels of the octree, determining occupancy symbols indicating occupancy states of the subdivisions of the divisions at a given octree level, wherein the occupancy symbols indicate subdivisions of a division occupied with points of the point cloud and subdivisions of the division unoccupied with points of the point cloud and encoding the occupancy symbols. To encode the occupancy symbols a first binary information is encoded if a given occupancy symbol is included in a look-up table, wherein the binary information includes an index value into the look-up table for the given occupancy symbol, and wherein the look-up table includes a sub-set of frequently encoded occupancy symbols of a set of possible occupancy symbols for the divisions of the point cloud at the given octree level. Additionally, to encode the occupancy symbols another binary information is encoded if the given occupancy symbol is not included in the look up table, but is included in a cache, wherein the other binary information includes an index value in the cache for the given occupancy symbol, wherein the cache includes another sub-set of recently encoded occupancy symbols of the set of possible occupancy symbols for the divisions of the point cloud at the given octree level. Furthermore, to encode the occupancy symbols a binary representation of the given occupancy symbol is encoded if the given occupancy symbol is not included in the look-up table or the cache.

In some embodiments, a method includes receiving an encoded point cloud encoded via an octree geometrical compression technique and decoding occupancy symbols for divisions of the encoded point cloud. Decoding an occupancy symbol comprises determining whether a first bit is set indicating that the given occupancy symbol is included in a look-up table, wherein if the first bit indicates the given occupancy symbol is included in the look up table, the given occupancy symbol is read from the look-up table based on an index value included in the received encoded point cloud, wherein the index value corresponds to the given occupancy symbol in the look-up table. Decoding the occupancy symbol also includes determining, if the first bit is not set, whether another bit is set indicating that the given occupancy symbol is included in a cache of the decoder, wherein if the other bit indicates the given occupancy symbol is included in the cache, the given occupancy symbol is read from the cache based on an index value included in the received encoded point cloud, wherein the index value corresponds to the given occupancy symbol in the cache. Decoding the occupancy symbol further includes decoding a binary representation of the given occupancy symbol included in the received encoded point cloud if the first bit or other bit are not set indicating that the given occupancy symbol is included in the look-up table or the cache.

BRIEF DESCRIPTION OF THE DRAWINGS

FIG. 2 illustrates a process for generating neighborhood look-up tables for use in encoding spatial information of a point cloud using an octree, according to some embodiments.

FIG. 4B illustrates an example process for selecting an encoding context for a given cube of an octree based on a determined neighborhood configuration for the given cube, according to some embodiments.

Figure 1A:
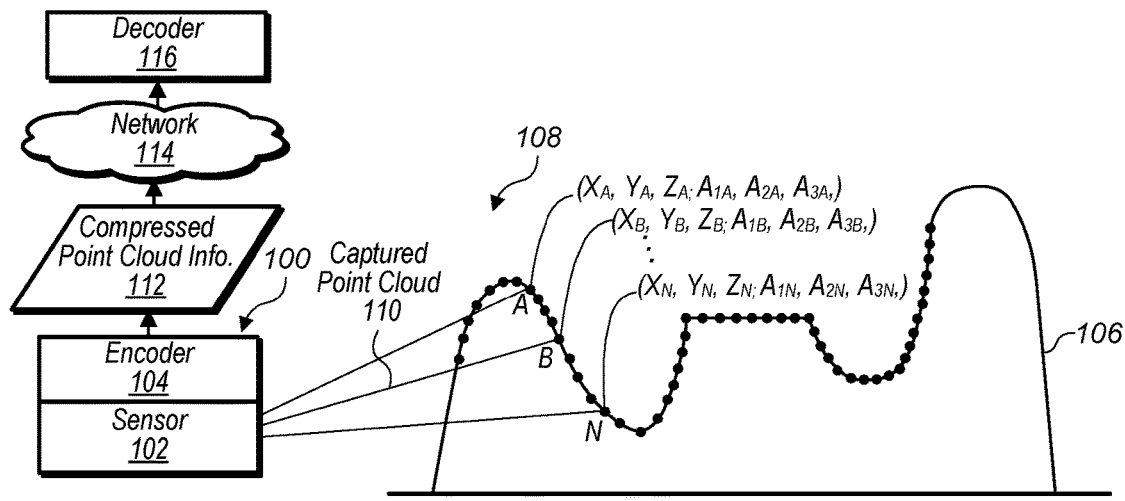
FIG. 1A illustrates a system comprising a sensor that captures information for points of a point cloud and an encoder that compresses attribute information and/or spatial information of the point cloud, where the compressed point cloud information is sent to a decoder, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

As data acquisition and display technologies have become more advanced, the ability to capture point clouds comprising thousands or millions of points in 2-D or 3-D space, such as via LIDAR systems, has increased. Also, the development of advanced display technologies, such as virtual reality or augmented reality systems, has increased potential uses for point clouds. However, point cloud files are often very large and may be costly and time-consuming to store and transmit. For example, communication of point clouds over private or public networks, such as the Internet, may require considerable amounts of time and/or network resources, such that some uses of point cloud data, such as real-time uses, may be limited. Also, storage requirements of point cloud files may consume a significant amount of storage capacity of devices storing the point cloud files, which may also limit potential applications for using point cloud data.

In some embodiments, an encoder may be used to generate a compressed point cloud to reduce costs and time associated with storing and transmitting large point cloud files. In some embodiments, a system may include an encoder that compresses attribute information and/or spatial information (also referred to herein as geometry information) of a point cloud file such that the point cloud file may be stored and transmitted more quickly than non-compressed point clouds and in a manner such that the point cloud file may occupy less storage space than non-compressed point clouds. In some embodiments, compression of spatial information and/or attributes of points in a point cloud may enable a point cloud to be communicated over a network in real-time or in near real-time. For example, a system may include a sensor that captures spatial information and/or attribute information about points in an environment where the sensor is located, wherein the captured points and corresponding attributes make up a point cloud. The system may also include an encoder that compresses the captured point cloud attribute information. The compressed attribute information of the point cloud may be sent over a network in real-time or near real-time to a decoder that decompresses the compressed attribute information of the point cloud. The decompressed point cloud may be further processed, for example to make a control decision based on the surrounding environment at the location of the sensor. The control decision may then be communicated back to a device at or near the location of the sensor, wherein the device receiving the control decision implements the control decision in real-time or near real-time. In some embodiments, the decoder may be associated with an augmented reality system and the decompressed spatial and/or attribute information may be displayed or otherwise used by the augmented reality system. In some embodiments, compressed attribute information for a point cloud may be sent with compressed spatial information for points of the point cloud. In other embodiments, spatial information and attribute information may be separately encoded and/or separately transmitted to a decoder.

In some embodiments, a system may include a decoder that receives one or more point cloud files comprising compressed attribute information via a network from a remote server or other storage device that stores the one or more point cloud files. For example, a 3-D display, a holographic display, or a head-mounted display may be manipulated in real-time or near real-time to show different portions of a virtual world represented by point clouds. In order to update the 3-D display, the holographic display, or the head-mounted display, a system associated with the decoder may request point cloud files from the remote server based on user manipulations of the displays, and the point cloud files may be transmitted from the remote server to the decoder and decoded by the decoder in real-time or near real-time. The displays may then be updated with updated point cloud data responsive to the user manipulations, such as updated point attributes.

In some embodiments, a system, may include one or more LIDAR systems, 3-D cameras, 3-D scanners, etc., and such sensor devices may capture spatial information, such as X, Y, and Z coordinates for points in a view of the sensor devices. In some embodiments, the spatial information may be relative to a local coordinate system or may be relative to a global coordinate system (for example, a Cartesian coordinate system may have a fixed reference point, such as a fixed point on the earth, or may have a non-fixed local reference point, such as a sensor location).

In some embodiments, such sensors may also capture attribute information for one or more points, such as color attributes, reflectivity attributes, velocity attributes, acceleration attributes, time attributes, modalities, and/or various other attributes. In some embodiments, other sensors, in addition to LIDAR systems, 3-D cameras, 3-D scanners, etc., may capture attribute information to be included in a point cloud. For example, in some embodiments, a gyroscope or accelerometer, may capture motion information to be included in a point cloud as an attribute associated with one or more points of the point cloud. For example, a vehicle equipped with a LIDAR system, a 3-D camera, or a 3-D scanner may include the vehicle's direction and speed in a point cloud captured by the LIDAR system, the 3-D camera, or the 3-D scanner. For example, when points in a view of the vehicle are captured they may be included in a point cloud, wherein the point cloud includes the captured points and associated motion information corresponding to a state of the vehicle when the points were captured.

In some embodiments, attribute information may comprise string values, such as different modalities. For example attribute information may include string values indicating a modality such as "walking", "running", "driving", etc. In some embodiments, an encoder may comprise a "string-value" to integer index, wherein certain strings are associated with certain corresponding integer values. In some embodiments, a point cloud may indicate a string value for a point by including an integer associated with the string value as an attribute of the point. The encoder and decoder may both store a common string value to integer index, such that the decoder can determine string values for points based on looking up the integer value of the string attribute of the point in a string value to integer index of the decoder that matches or is similar to the string value to integer index of the encoder.

In some embodiments, an encoder compresses and encodes spatial information of a point cloud in addition to compressing attribute information for attributes of the points of the point cloud. For example, to compress spatial information an octree may be generated wherein, respective occupied/non-occupied states of each cube and/or sub-cube of the octree are encoded. This sequence of encoded occupied/unoccupied states for eight sub-cubes of a given cube may be encoded as an occupancy symbol for the cube of the octree that conveys spatial information for points of a point cloud to a decoder.

Figure 3A:
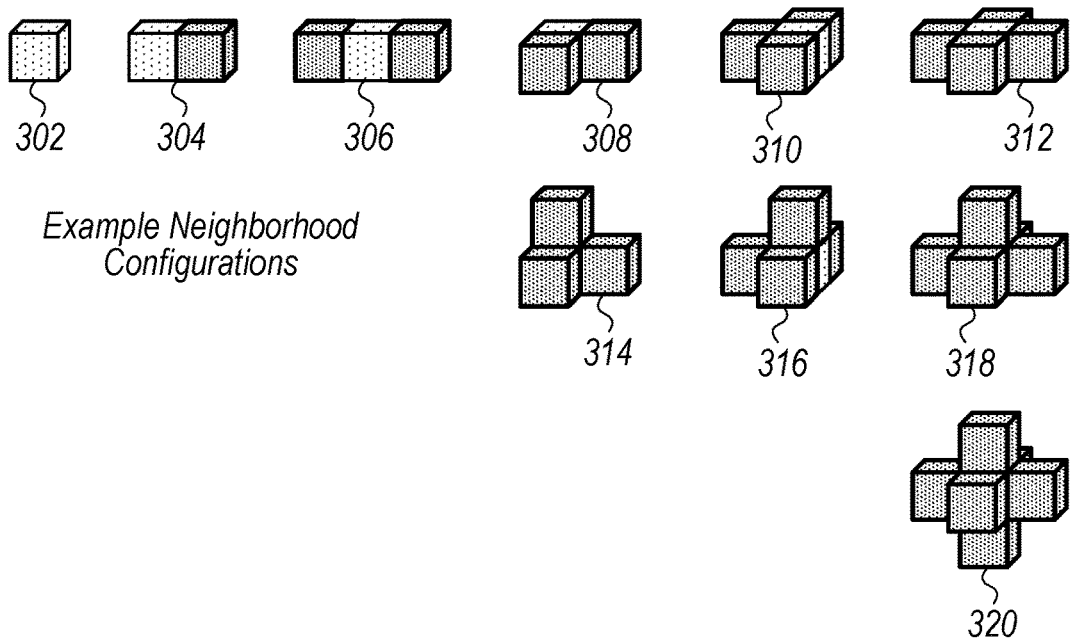
FIG. 3A illustrates example neighborhood configurations of cubes of an octree, according to some embodiments.

In some embodiments, an encoder and/or decoder may determine a neighborhood occupancy configuration for a given cube of an octree that is being encoded or decoded. The neighborhood occupancy configuration may indicate occupancy states of neighboring cubes that neighbor the given cube being encoded. For example, a cube with for which neighboring cubes are occupied is more likely to also include occupied sub-cubes than a cube for which neighboring cubes are un-occupied. As shown in FIG. 3A and discussed in more detail below, there are various possible neighborhood occupancy configurations for a given cube being encoded.

In some embodiments, an encoder and/or decoder may map particular neighborhood occupancy configurations to particular encoding contexts, wherein different encoding contexts are used to encode cubes having different neighborhood occupancy configurations. In some embodiments, less frequently occurring neighborhood occupancy configurations may share a common encoding context. For example, FIG. 3A illustrates 10 possible neighborhood occupancy configurations. In some embodiments, the encoder may utilize fewer than 10 encoding context. For example, in some embodiments a set of more frequently occurring neighborhood occupancy configurations may each be associated with a separate encoding context and one or more sets of less frequently occurring neighborhood occupancy configurations may be grouped together and associated with one or more shared encoding contexts. For example, in some embodiments, the number of encoding contexts may be reduced to 6 encoding contexts, wherein the five most frequently occurring neighborhood occupancy configurations are each assigned a different encoding context, and the remaining five less frequently occurring neighborhood occupancy configurations share a common encoding context.

In some embodiments, a counter may track the frequency of occurrences of the respective neighborhood occupancy configurations and the assignment of encoding contexts for the various neighborhood occupancy configurations may be adjusted based on updated frequency counts. In some embodiments, a user, such as an engineer implementing the encoder, may set default groupings for neighborhood occupancy configurations and encoding contexts. In some embodiments, counters for the neighborhood occupancy configurations may be re-set when the encoder transitions to encoding a next subdivision level of an octree.

Figure 3B:
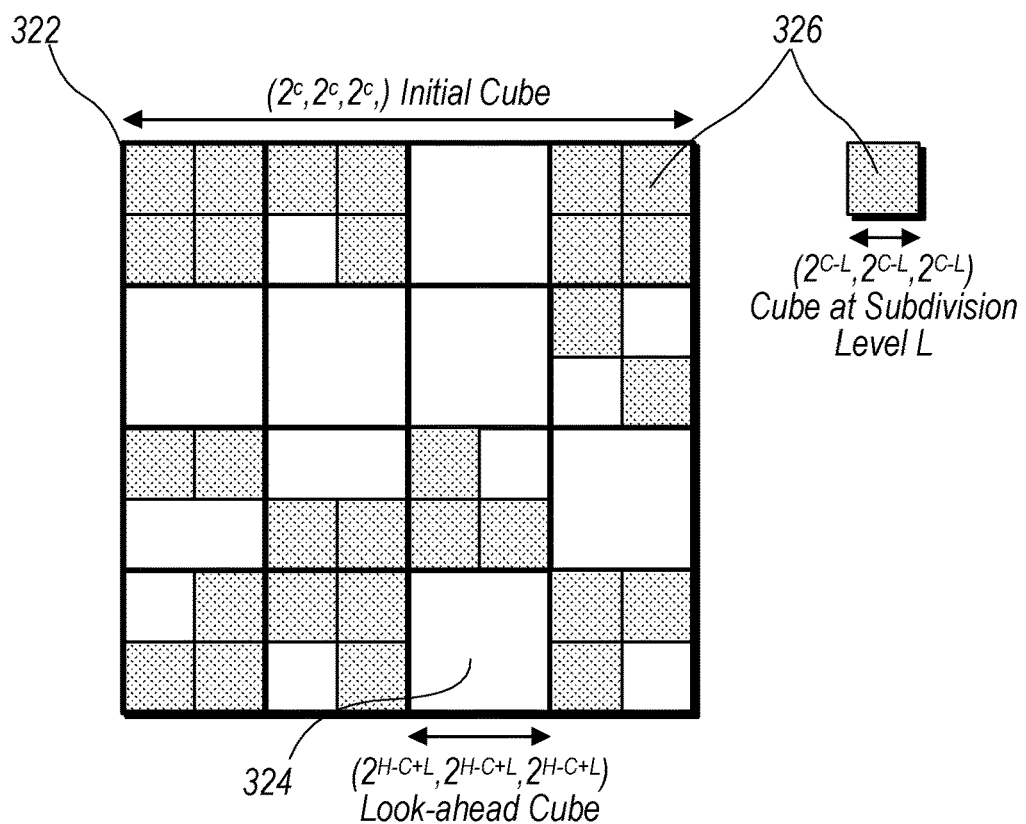
FIG. 3B illustrates an example look-ahead cube, according to some embodiments.

In some embodiments, a look-ahead cube and/or one or more neighborhood look-up tables may be used to determine a neighborhood occupancy configuration for a given cube being encoded and to determine a particular encoding context to use for encoding occupancy symbols of the given cube. For example, FIG. 3B illustrates a look-ahead cube that may be used to populate a neighborhood look-up table with information indicating which cubes included in the look-ahead cube are populated with points or are unpopulated. In some embodiments, a neighborhood look-up table may be generated for each look-ahead cube describing the population state of the constituent cubes in the look-ahead cube. Also, an additional neighborhood look-up table may include index values that map respective neighborhood occupancy configurations to respective encoding contexts. As discussed above, in some embodiments, more than one neighborhood occupancy configuration may be mapped to a same index value and associated encoding context.

In some embodiments, an encoder and/or decoder may generate and update an adaptive look-up table and cache for each encoding context. The adaptive look-up table and cache of a given encoding context may are used to encode occupancy symbols for cubes having a neighborhood occupancy configuration corresponding to the given encoding context. Since each cube of an octree includes eight sub-cubes, there are 256 possible occupancy symbols to represent an occupancy state of a given cube (e.g. $2^8$ or 256 possible occupancy symbols). However, an adaptive look-up table with an index may include fewer occupancy symbols, such as $2^5$ occupancy symbols (e.g. 32 or index values 0-31 for occupancy symbols), and a cache may include even fewer occupancy symbols, such as $2^4$ occupancy symbols (e.g. 16 or index values 0-15 for occupancy symbols). Thus the use of an adaptive look-up table and/or cache may reduce a number of bits required to encode occupancy symbols for cubes of an octree. The use of adaptive look-up tables and caches to improve compression efficiency for compressing occupancy symbols is further discussed below.

FIG. 1A illustrates a system comprising a sensor that captures information for points of a point cloud and an encoder that compresses spatial and/or attribute information of the point cloud, where the compressed spatial and/or attribute information is sent to a decoder, according to some embodiments.

System 100 includes sensor 102 and encoder 104. Sensor 102 captures a point cloud 110 comprising points representing structure 106 in view 108 of sensor 102. For example, in some embodiments, structure 106 may be a mountain range, a building, a sign, an environment surrounding a street, or any other type of structure. In some embodiments, a captured point cloud, such as captured point cloud 110, may include spatial and attribute information for the points included in the point cloud. For example, point A of captured point cloud 110 comprises X, Y, Z coordinates and attributes 1, 2, and 3. In some embodiments, attributes of a point may include attributes such as R, G, B color values, a velocity at the point, an acceleration at the point, a reflectance of the structure at the point, a time stamp indicating when the point was captured, a string-value indicating a modality when the point was captured, for example "walking", or other attributes. The captured point cloud 110 may be provided to encoder 104, wherein encoder 104 generates a compressed version of the point cloud (compressed point cloud information 112) that is transmitted via network 114 to decoder 116. In some embodiments, a compressed version of the point cloud, such as compressed point cloud information 112, may be included in a common compressed point cloud that also includes compressed spatial information for the points of the point cloud or, in some embodiments, compressed spatial information and compressed attribute information may be communicated as separate files.

In some embodiments, encoder 104 may be integrated with sensor 102. For example, encoder 104 may be implemented in hardware or software included in a sensor device, such as sensor 102. In other embodiments, encoder 104 may be implemented on a separate computing device that is proximate to sensor 102.

Figure 1B:
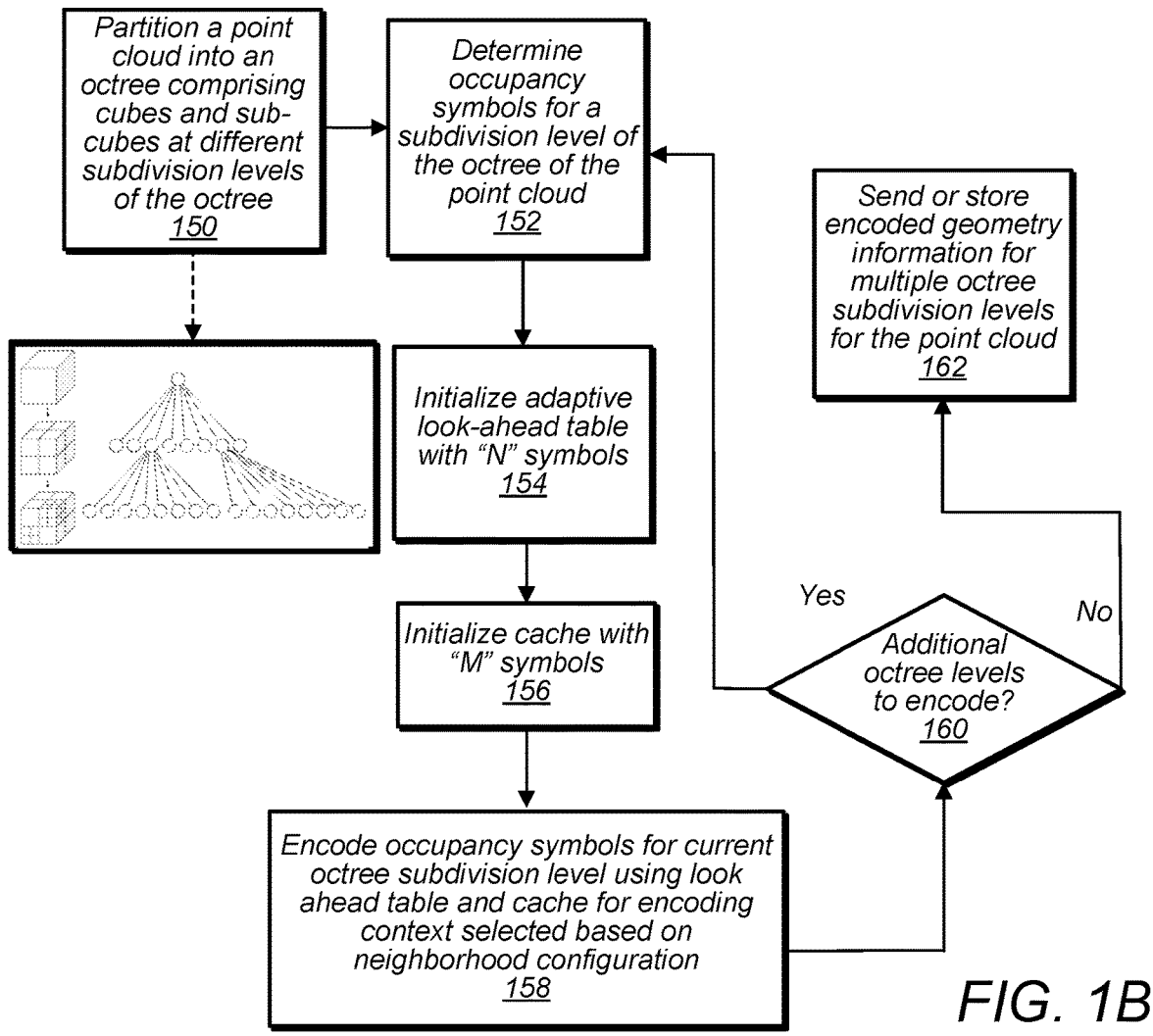
FIG. 1B illustrates a process for encoding spatial information of a point cloud using an octree, according to some embodiments.

FIG. 1B illustrates a process for encoding spatial information of a point cloud using an octree, according to some embodiments.

In some embodiments, at 150, a point could, such as captured point cloud 110, is partitioned into an octree comprising cubes and sub-cubes at different subdivision levels of the octree. In some embodiments, occupancy symbols for respective octree subdivision levels may be encoded prior to further subdividing the octree into another lower octree subdivision level. In some embodiments, an octree may be subdivided until the lowest level octree subdivision levels include a single point or reach a pre-set minimum cube size. In some embodiments, a point cloud may be partitioned to form an octree comprising multiple octree subdivision layers and occupancy symbols for the multiple octree subdivisions layers may be encoded.

For example, at 152, occupancy symbols for a cubes at a given level of the octree for the point cloud are determined. In some embodiments, the occupancy symbols, prior to being encoded, may comprise eight-bit binary values indicating whether or not each of the eight sub-cubes of a given cube are occupied or are not occupied with points of the point cloud. For example, a value of 1 may be assigned for an occupied sub-cube and a value of 0 may be assigned for an unoccupied sub-cube. In some embodiments, each bit of the eight bits included in a pre-encoding occupancy symbol may indicate whether or not a respective one of the eight sub-cubes of the given cube represented by the occupancy symbol is occupied or unoccupied.

As discussed above, in some embodiments, an adaptive look-up table known by both the encoder and decoder (or inferred by the decoder) may be used to encode occupancy symbols using fewer bits. For example, a look-up table may include 31 entries requiring a 5-bit value to communicate a respective index value into the look-up table, wherein each index value is associated with an eight-bit occupancy symbol. Thus, instead of encoding eight bits to communicate the occupancy symbol, fewer bits, such as five bits, may be used to encode an index value for the occupancy symbol.

In some embodiments, an adaptive look-up table may include a sub-set of a larger set of possible occupancy symbols. For example, there may be 256 possible occupancy symbols (based on $2^8$ possible combinations of occupied/unoccupied sub-cubes). However, an adaptive look-up table may include fewer occupancy symbols, such as 31 or ($2^5$ combinations). In some embodiments, an adaptive look-up table may include the most frequently encoded occupancy symbols and may be updated based on updated frequency counts for the possible occupancy symbols. Additionally, in some embodiments, an adaptive look-up table may further be organized such that the most frequently encoded occupancy symbols are assigned lower index values in the adaptive look-up table and less frequently encoded occupancy symbols are assigned larger index values in the adaptive look-up table.

In some embodiments, an encoder may utilize an adaptive binary arithmetic encoder to encode occupancy symbols with index values below a given index value threshold and may utilize a static binary arithmetic encoder to encode index values greater than the given index value threshold. In some embodiments, the adaptive binary arithmetic encoder may further utilize adaptive arithmetic encoding contexts (e.g. 31 contexts, 9 contexts, 5 contexts, etc.) to encode the lower index values and may use a common static context to encode the larger index values.

In some embodiments, an encoder and/or decoder may further maintain a cache of the most recently encoded occupancy symbols for a given encoding context. For example, an encoder may maintain a cache of the 16 most recently encoded occupancy symbols. In some embodiments, the cache may include recently encoded occupancy symbols that have not been encoded frequently enough to be included in the adaptive look-up table. In some embodiments, an encoder may encode a four-bit binary value to communicate an index value in the cache for a given occupancy symbol being encoded instead of encoding an eight-bit binary representation for the occupancy symbol. In some embodiments, each time an occupancy symbol not included in the adaptive look-up table is encoded, the occupancy symbol may be added to a front of the cache and an oldest (since last encoded) occupancy symbol may be removed from a back of the cache. Because the encoder and decoder process cubes of the octree in a same order, the decoder cache and adaptive look-up table may mirror the encoder adaptive look-up table and cache at a given point in the encoding (or decoding) of occupancy symbols at a given subdivision level of the octree.

For example, at 154, the adaptive look-ahead table is initialized with "N" occupancy symbols and, at 156, the cache is initialized with "M" occupancy symbols. In some embodiments, "N" and "M" may be default values, values selected based on historical performance, user defined values, etc.

At 158, occupancy symbols for respective cubes of a given octree level are encoded using respective look-ahead tables and caches for the respective encoding contexts selected for the respective cubes, wherein the encoding contexts are selected based on neighborhood occupancy configurations for the respective cubes.

At 160, it is determined if there are additional octree levels to encode. If so, the process reverts to 152 and repeats for the next octree subdivision level. If not, at 162, the encoded occupancy symbols are stored or sent to a decoder as part of an encoded point cloud file.

FIG. 2 illustrates a process for generating neighborhood look-up tables for use in encoding spatial information of a point cloud using an octree, according to some embodiments.

At 202, a first or next octree subdivision level is selected to be evaluated. In some embodiments, the process described in FIG. 2 may be repeated for each octree subdivision level.

At 204, the points of the point cloud are subdivided into cubes for the selected octree subdivision level having dimensions ($2^{C-L}$, $2^{C-L}$, $2^{C-L}$). For example, FIG. 3B illustrates initial cube 322, which may encompass a point cloud being encoded, and cube 326 at subdivision level L.

At 206, a set of non-overlapping look-ahead cubes is determined for the point cloud. The look-ahead cubes each include 8 cubes of the size of the cubes at the given subdivision level. For example, look-ahead cube 324 may include eight cubes at subdivision level L (e.g. eight cubes 326).

At 208, neighborhood look-up tables are generated for each look-ahead cube. For example, a neighborhood look-up table for a given look-ahead cube may indicate which cubes included in the look-ahead cube are occupied and which cubes included in the look-ahead cube are unoccupied. As discussed above, an additional neighborhood look-up table may further map various neighborhood configurations to particular encoding contexts and some neighborhood configurations may share a common encoding context. The neighborhood configurations may be determined based on the look-ahead tables generated for each of the look-ahead cubes, and the encoding contexts may be determined based on the neighborhood configurations mapped to the encoding contexts in the additional neighborhood look-up table. In some embodiments, the neighborhood look-up table and the additional neighborhood look-up table may be combined into a common table or may be ordered in another manner.

As an example, FIG. 3A illustrates 10 possible neighborhood configurations for cube 302. For example, the first neighborhood occupancy configuration is cube 302 alone without any occupied neighboring cubes. In the subsequent neighborhood configurations cube 302 has a single occupied neighboring cube (304), two occupied neighboring cubes (306), two occupied neighboring cubes in a different configuration (308), three occupied neighboring cubes in different configurations (310, 312, and 314), four occupied neighboring cubes in different configurations (316 and 318), and five occupied neighboring cubes (320).

At 210, the process proceeds to encoding the occupancy symbols for the selected subdivision level of the octree based on the determined encoding contexts selected based on the neighborhood configurations determined using the look-ahead cube.

FIG. 3A illustrates example neighborhood configurations of cubes of an octree, according to some embodiments. FIG. 3B illustrates an example look-ahead cube, according to some embodiments. FIGS. 3A and 3B are described above.

Figure 4A:
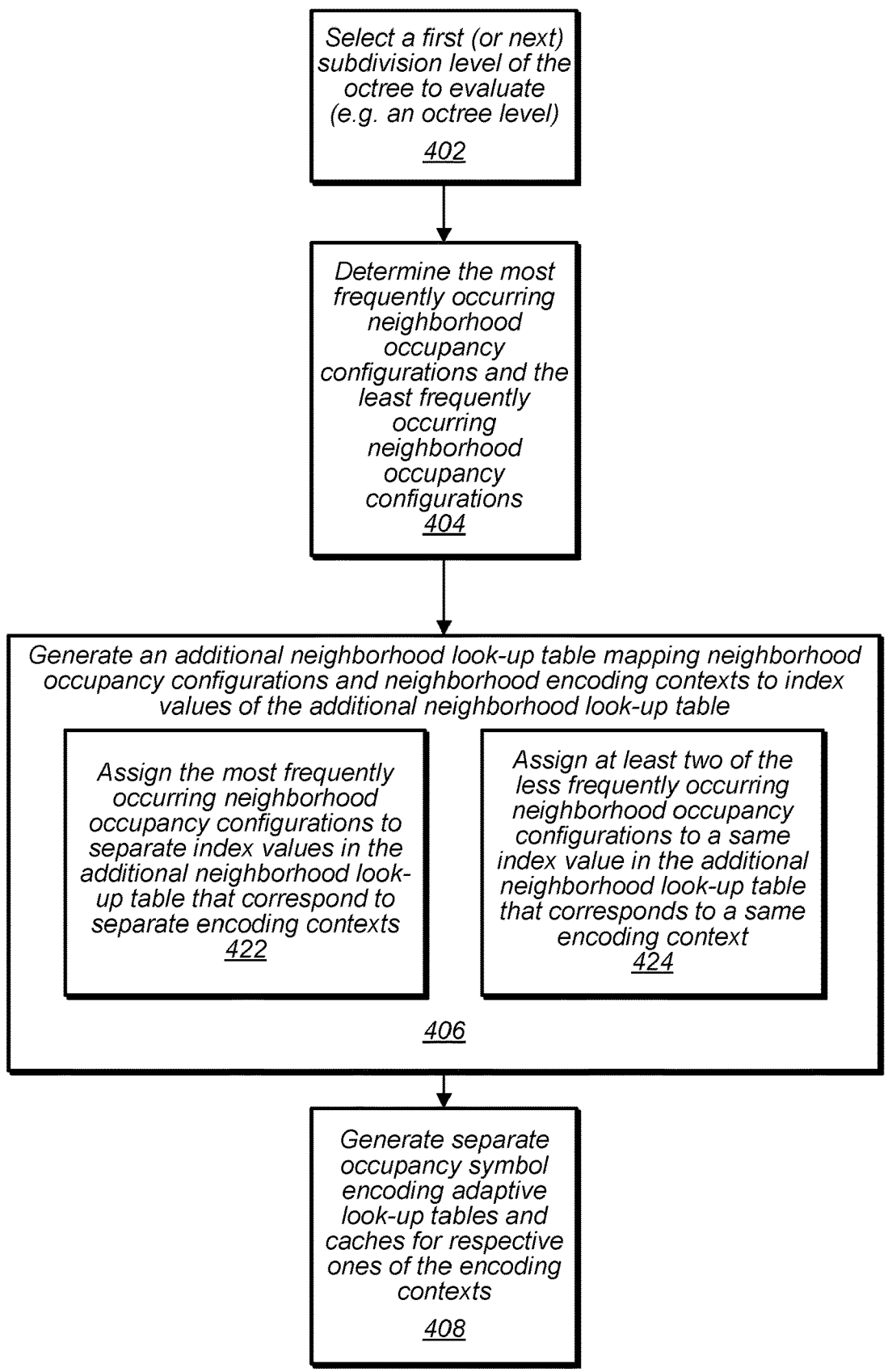
FIG. 4A illustrates a process for assigning encoding contexts to neighborhood configurations, according to some embodiments.

FIG. 4A illustrates a process for assigning encoding contexts to neighborhood configurations, according to some embodiments.

In some embodiments, in order to generate an additional neighborhood look-up table (in addition to a neighborhood look-up table comprising occupancy information for cubes of a look-ahead cube), an encoder may map neighborhood configurations such as neighborhood configurations 302, 304, 306, 308, 310, 312, 314, 316, 318, and 320 to respective index values of the additional neighborhood look-up table. Additionally, encoding contexts are mapped to the index values. In this way, by determining a neighborhood configuration for a given cube, an encoder can also determine an encoding context to use to encode an occupancy symbol for the given cube. In some embodiments, an encoder and a decoder may follow a similar process for mapping neighborhood occupancy configurations to index values of an additional neighborhood look-up table and corresponding encoding contexts such that the decoder will map a given neighborhood occupancy configuration to a same encoding context as was used at an encoder to encode a cube having the given neighborhood occupancy configuration.

In some embodiments, more than one neighborhood occupancy configuration may be mapped to a same index value in the additional neighborhood look-up table and may share a common encoding context with other neighborhood occupancy configurations mapped to the same index value in the additional neighborhood look-up table.

At 402, an encoder or decoder selects a subdivision level of the octree to evaluate. In some embodiments, the additional neighborhood look-up table may be re-initialized or re-set for each sub-division level. For example, in some embodiments, frequently occurring neighborhood occupancy configurations at a given octree level may vary as compared to frequently occurring neighborhood occupancy configurations at other subdivision levels of the octree. Thus, the additional neighborhood occupancy look-up table may be re-set for each octree level.

At 404, an encoder or decoder determines the most frequently occurring neighborhood occupancy configurations. In some embodiments each of the neighborhood occupancy configurations, such as neighborhood occupancy configurations 302, 304, 306, 308, 310, 312, 314, 316, 318, and 320, may have an associated counter that tracks occurrences of the neighborhood occupancy configurations.

At 406, the additional neighborhood look-up table is generated. The additional neighborhood look-up table maps the neighborhood occupancy configurations to encoding contexts. In some embodiments, at 422 the most frequently occurring neighborhood occupancy configurations are assigned to separate index values in the additional neighborhood look-up table, wherein the separate index values are associated with separate encoding contexts. In some embodiments, at 424, at least two less frequently occurring neighbor occupancy configurations are assigned to a single index value with a single associated encoding context. For example, in some embodiments, the most frequently occurring five neighborhood occupancy configurations of the 10 possible neighborhood occupancy configurations are assigned the first five index values and the remaining less frequently occurring five neighborhood occupancy configurations are assigned a common sixth index value that has an associated encoding context.

At 408, separate occupancy symbol adaptive look-up tables and caches are generated and updated for the respective encoding contexts.

FIG. 4B illustrates an example process for selecting an encoding context for a given cube of an octree based on a determined neighborhood configuration for the given cube, according to some embodiments.

At 452, an encoder or decoder determines a neighborhood occupancy configuration for a given cube being encoded or decoded. In some embodiments, an encoder determines the neighborhood occupancy configuration based on a neighborhood look-up table populated from a look-ahead cube that includes the given cube being encoded.

At 454, the encoder or decoder selects a particular encoding context for encoding (or decoding) the occupancy symbol corresponding to the given cube with the determined neighborhood occupancy configuration. In some embodiments, the particular encoding context is selected based on identifying the determined neighborhood occupancy configuration in an additional neighborhood look-up table comprising index values that map neighborhood occupancy configurations to neighborhood encoding contexts, where less probable occupancy configurations share a common index value and corresponding neighborhood encoding context in the additional neighborhood look-up table.

Figure 5A:
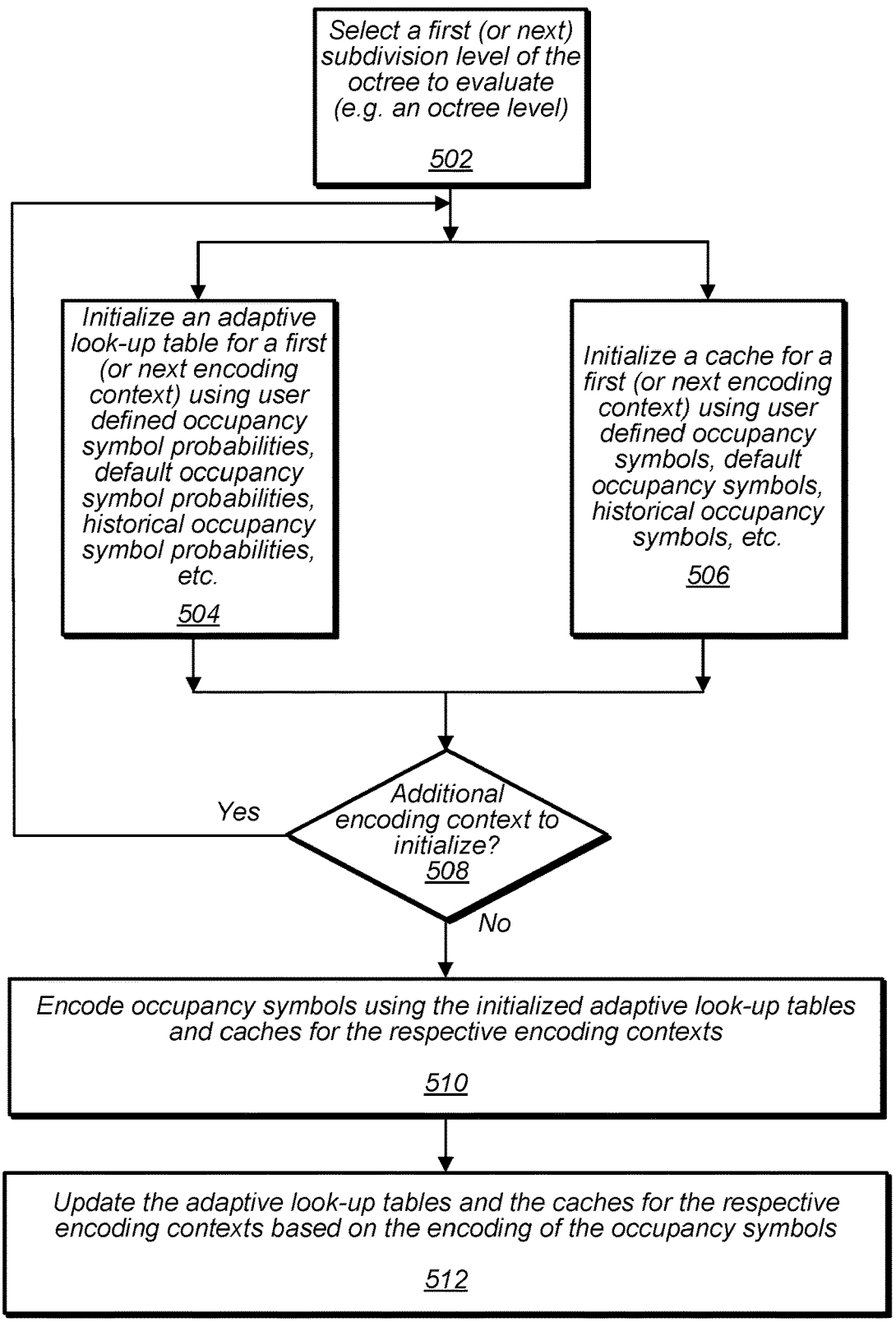
FIGS. 5A-C illustrates example processes for initializing and updating look-ahead tables and caches for respective encoding contexts, according to some embodiments.
Figure 5B:
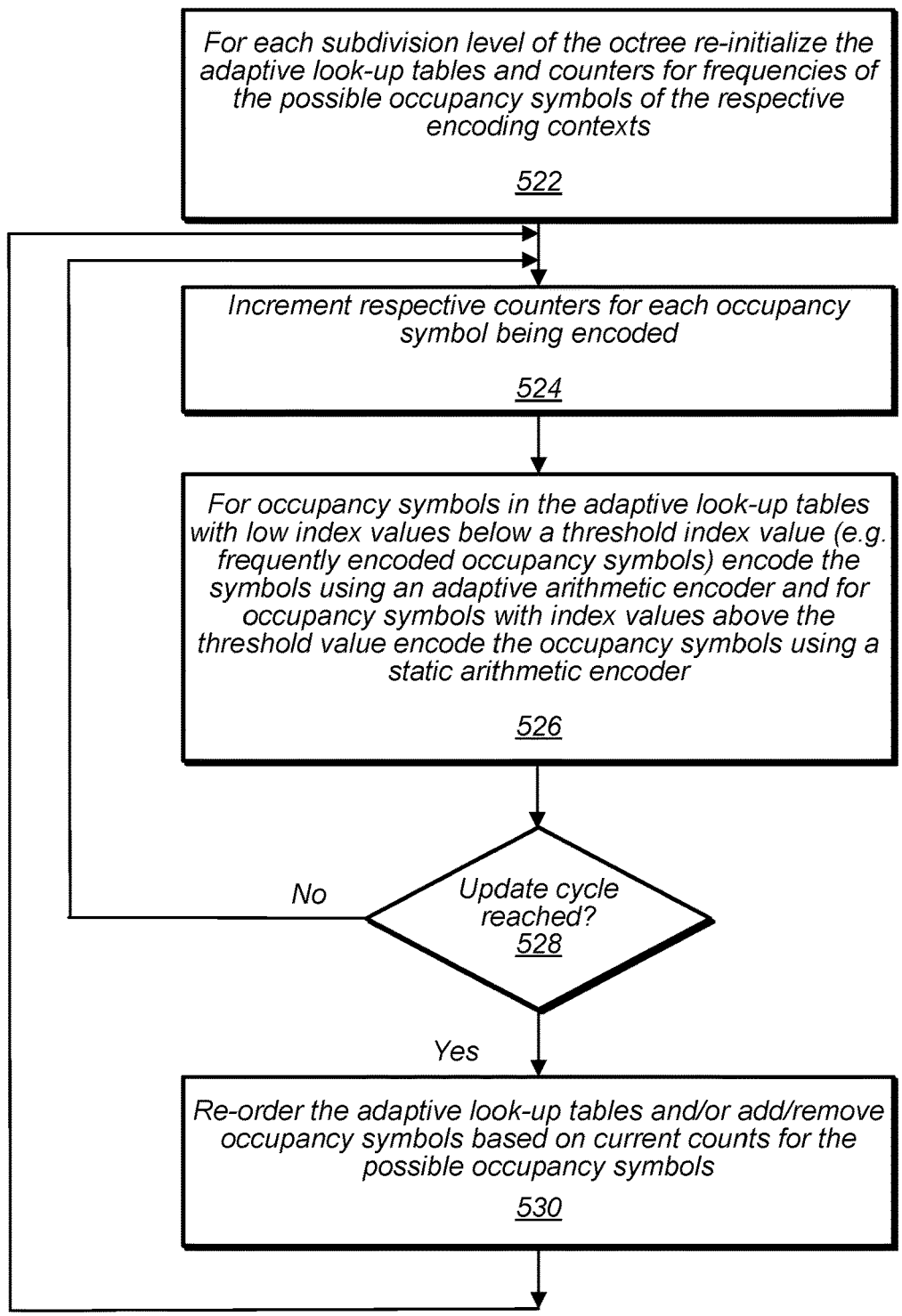
Figure 5C:
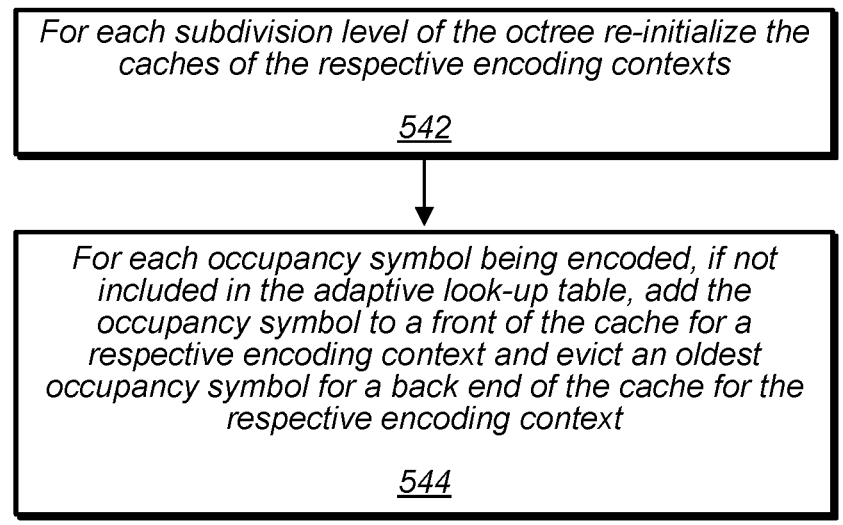

FIGS. 5A-C illustrates example processes for initializing and updating look-ahead tables and caches for respective encoding contexts, according to some embodiments.

At 502, an encoder selects an octree subdivision level to evaluate.

At 504, an encoder (or decoder) initializes an adaptive look-up table for a first or next encoding context for the given octree subdivision level. As discussed above, in some embodiments multiple encoding contexts may be used depending on neighborhood occupancy configurations. In some embodiments, the adaptive look-up table may be initialized using user defined occupancy symbol probabilities, default occupancy symbol probabilities, historical occupancy symbol probabilities, etc.

In a similar manner, at 506, an encoder (or decoder) initializes a cache for the first or next encoding context for the given octree subdivision level. In some embodiments, the cache may be initialized using user defined occupancy symbols, default occupancy symbols, historical occupancy symbols, etc.

At 508, it is determined if there are additional encoding contexts to initialize. If so, 504 and 506 are repeated for the other encoding contexts.

At 510, an encoder encodes (or the decoder decodes) occupancy symbols using the initializes adaptive look-up tables and caches. For example, the encoding or decoding of the occupancy symbols may be performed as described in FIGS. 1-4 and 6-11.

At 512, an encoder (or decoder) updates the adaptive look-up tables and the caches for the respective encoding contexts based on the encoding of the occupancy symbols. For example FIG. 5B provides additional details regarding the updating of an adaptive look-up table and FIG. 5C provides additional details regarding the updating of a cache.

In FIG. 5B, at 522 the adaptive look-up table is re-initialized and the counters for the frequencies of the possible occupancy symbols are re-initialized for each subdivision level of the octree. In some embodiments, re-initializing the adaptive look-up table may comprise setting the occupancy symbols included in the adaptive look-up table to an initial set of occupancy symbols, such as user defined occupancy symbols, default occupancy symbols, historical occupancy symbols, etc. In some embodiments, the initialization may also include ordering the initial set of occupancy symbols in an initial order in the adaptive look-up table. Additionally, initializing the counters for the respective possible occupancy symbols may include setting the counters to zero or another initial starting value.

Subsequent to initializing the adaptive look-up tables for the encoding contexts, the adaptive look-up tables may be updated.

For example, at 524, the respective counters for the possible occupancy symbols are incremented for occupancy symbols encoded that match a respective one of the possible occupancy symbols.

Figure 7:
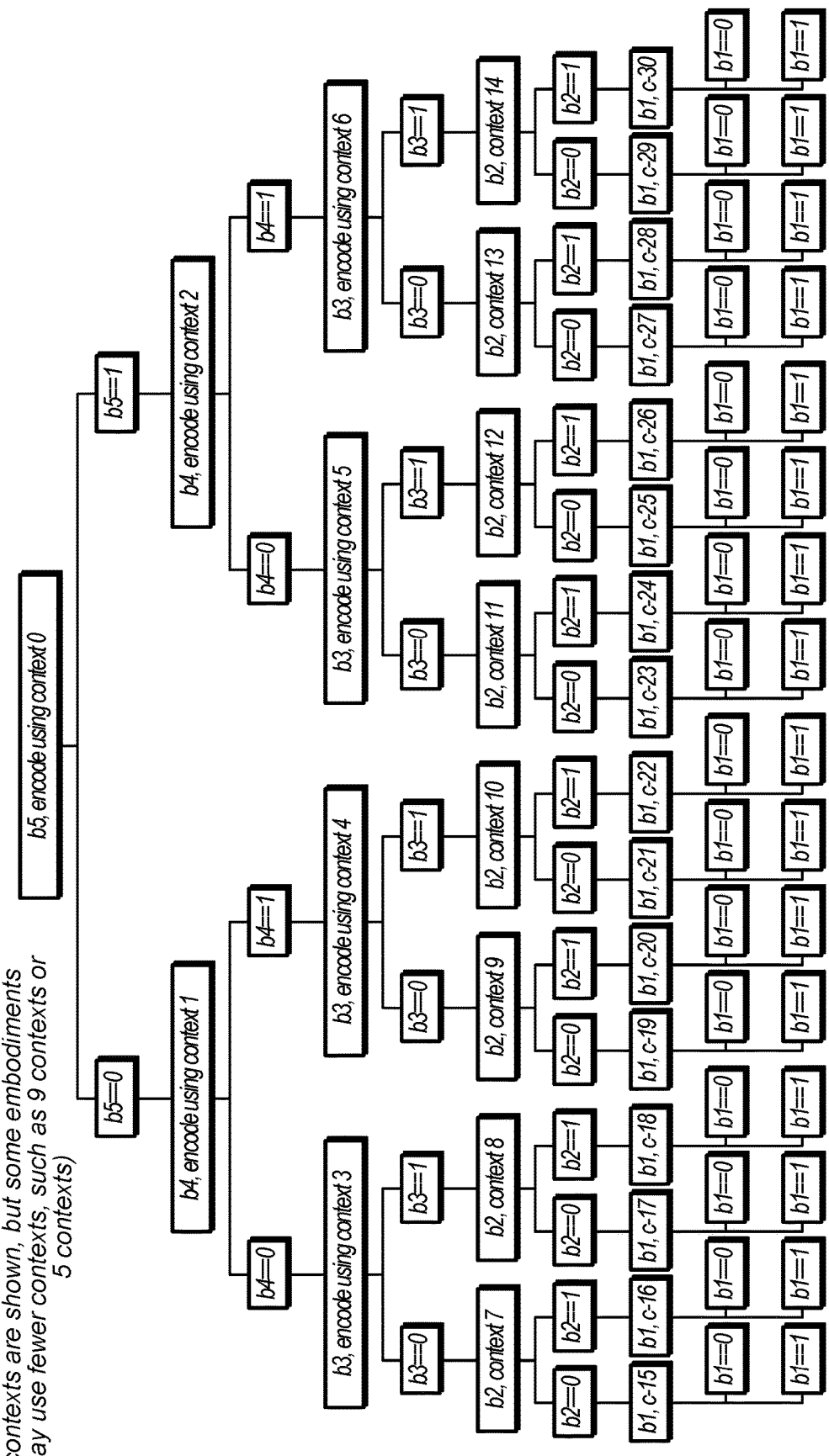
FIG. 7 illustrates, an example of 31 contexts that may be used to adaptively encode an index value of an occupancy symbol using an adaptive binary arithmetic encoder, according to some embodiments.

At 526, occupancy symbols in the adaptive look-up tables with low index values (e.g. occupancy symbols that are frequently encoded) are encoded using an adaptive binary arithmetic encoder with 31 contexts (as shown in FIG. 7), 9 contexts, 5 contexts, or a different number of contexts. Also, occupancy symbols in the adaptive look-up tables with higher index values, e.g. index values greater than a threshold index value, are encoded using a static binary arithmetic encoder.

At 528, it is determined if an update cycle for updating a given one of the adaptive look-up tables has been reached. If not, the process reverts to 524. If so, at 530, the given one of the adaptive look-up tables is re-ordered based on the current counts of the counters for the respective possible occupancy symbols. This may involve adding or removing occupancy symbols from the adaptive look-up table.

In some embodiments, when a number of symbols encoded reaches a threshold value, an update cycle may be triggered. In some embodiments, an update cycle threshold may vary as the encoder encodes more occupancy symbols. For example the threshold may increase as more symbols are encoded, such that initially the adaptive look-up tables are updated more frequently and then less frequently as more occupancy symbols are encoded.

In some embodiments, the counters for the possible occupancy map symbols may maintain the counts within a range. For example, when a counter with a largest count reaches a threshold value, the counts of all the counters may be divided in half such that relative differences between the counters are maintained but the overall counts are maintained within the range.

Subsequent to initializing the cache for the encoding contexts, the cache may be updated. For example, at 542, for each subdivision level of the octree the cache is re-initialized.

At 544, for each occupancy symbol being encoded that is not included in the adaptive look-up table, the occupancy symbol is added to a front of the cache for a respective encoding context and an oldest occupancy symbol is dropped from a back end of the cache for the respective encoding context.

Figure 6:
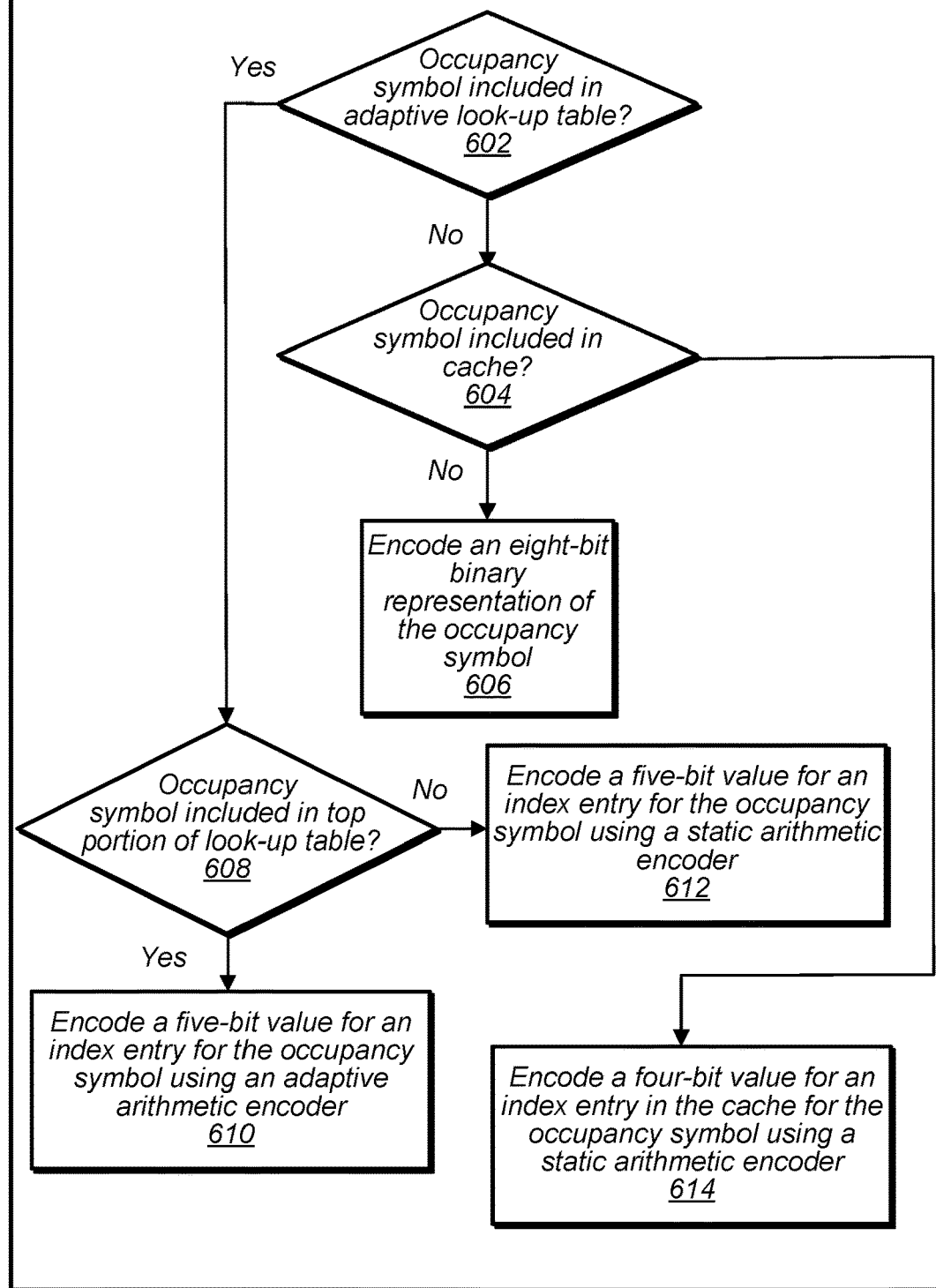
FIG. 6 illustrates additional steps for encoding spatial information of a point cloud using an octree, according to some embodiments.

FIG. 6 illustrates additional steps for encoding spatial information of a point cloud using an octree, according to some embodiments.

In some embodiments, encoding occupancy symbols for a current octree level based on most probable neighborhood configuration used to determine an encoding context and associated adaptive look ahead table as described in FIG. 1 step 158, may further include a process as described in FIG. 6.

At 602, for an occupancy symbol to be encoded, it is determined if the occupancy symbol is included in an adaptive look-up table for a selected encoding context for the occupancy symbol. If so, it is determined at 608 whether the index value in the adaptive look-up table for the occupancy symbol is less than a threshold index value (e.g. a low index value representing a frequently encoded occupancy symbol). If so, the occupancy symbol is encoded at 610 using a five-bit value for the index value into the adaptive look-up table, wherein an adaptive binary arithmetic encoder is used to encode the index value. Also, at 602, a bit may be set in the encoded binary information indicating the occupancy symbol is included in the adaptive look-up table. The encoded binary information may also include the encoded five-bit value for the index entry.

If it is determined at 608 that the index value is greater than the threshold index value, at 612 a five-bit binary value is encoded for the index entry in the adaptive look-up table for the occupancy symbol using a static binary encoder.

If it is determined at 602 that the occupancy symbol to be encoded is not included in the adaptive look-up table, at 604 it is determined whether the occupancy symbol is included in the cache. If so, a bit is set in the binary information indicating the occupancy symbol is in the cache and at 614 an index value for the occupancy symbol in the cache is encoded as a four-bit value that is also included in the binary information for the encoded occupancy symbol. In some embodiments, the cache index value is encoded using a static binary arithmetic encoder.

If the occupancy symbol is not in the adaptive look-up table and is not in the cache, at 606 an eight-bit binary representation of the occupancy symbol is encoded, for example using a static arithmetic encoder.

FIG. 7 illustrates, an example of 31 contexts that may be used to adaptively encode an index value of an occupancy symbol using an adaptive binary arithmetic encoder, according to some embodiments.

Figure 8:
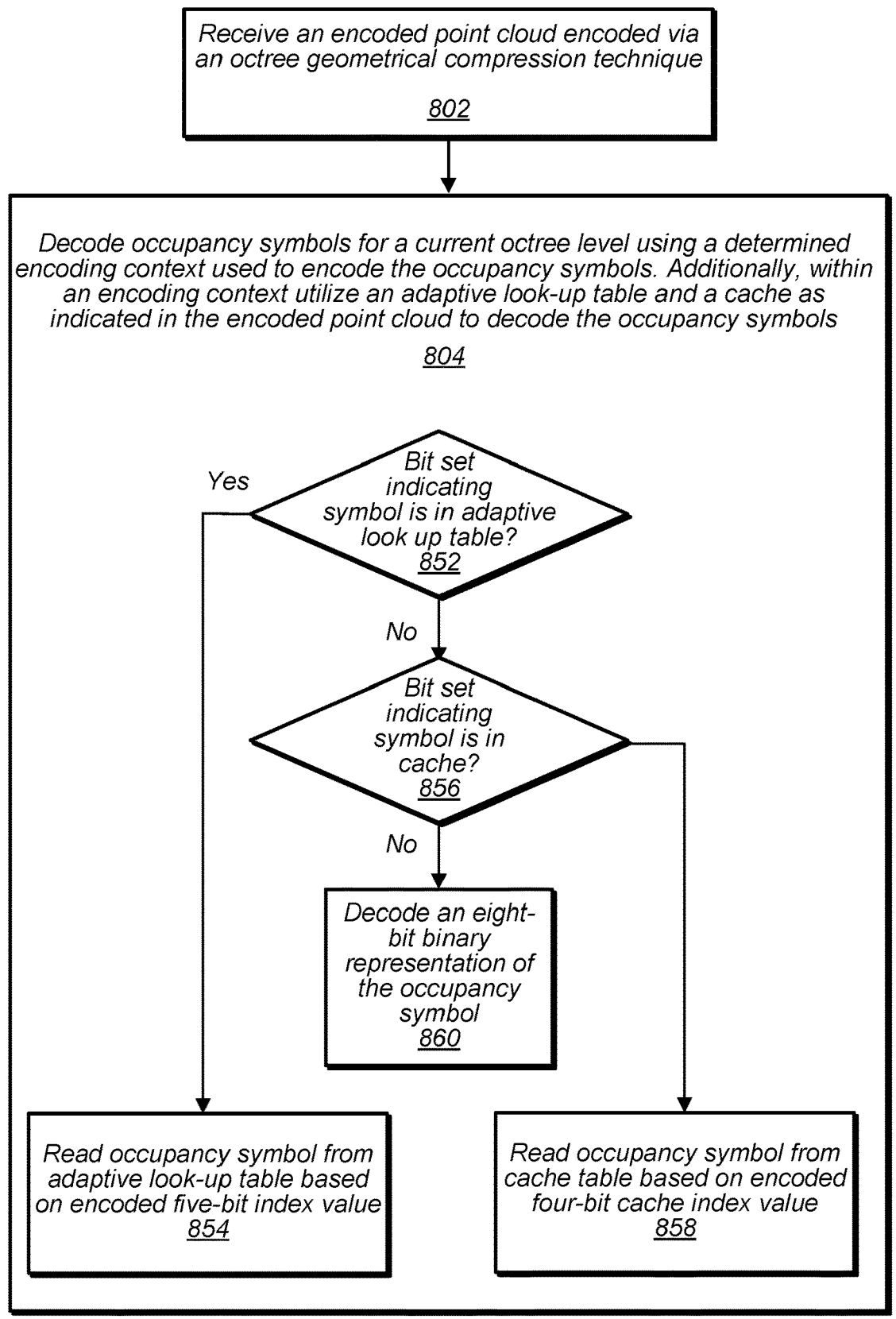
FIG. 8 illustrates steps for decoding spatial information of a point cloud encoded using an octree geometrical compression technique, according to some embodiments.

FIG. 8 illustrates steps for decoding spatial information of a point cloud encoded using an octree geometrical compression technique, according to some embodiments.

At 802, a decoder receives an encoded point cloud encoded via an octree geometrical compression technique.

At 804, the decoder decodes occupancy symbols for a current octree level using a look ahead cube and neighborhood occupancy tables to determine an encoding context used to encode the occupancy symbols. Additionally, within an encoding context the decoder utilize an adaptive look-up table and a cache as indicated in the encoded point cloud to decode the occupancy symbols. In some embodiments, a decoder may utilize similar or complementary processes as discussed herein for the encoder to determine an encoding context used to encode an occupancy symbol.

Once an encoding context is determined, the decoder may utilize the adaptive look-up table and cache associated with the determined encoding context to decode an occupancy symbol. In some embodiments, a process as described in 852-860 may be followed.

At 852, the decoder determines if a bit is set indicating the occupancy symbol being decoded is included in an adaptive look-up table for the encoding context. If so, the decoder decodes an index value for an index entry into the adaptive look-up table (e.g. using an adaptive or static binary arithmetic encoder) and at 854 reads the occupancy symbol from the adaptive look-up table based on the decoded index value into the adaptive look-up table for the occupancy symbol.

If the bit is not set at 852, it is determined at 856 whether a bit is set indicating that the occupancy symbol is included in the cache. If so, the decoder decodes an index value for an index entry into the cache and at 858 reads the occupancy symbol from a cache table based on the decoded index entry value.

If neither the bit at 852 or 856 is set, the decoder decodes an eight-bit representation of the occupancy symbol at 860.

The use of a binary arithmetic encoder as described herein reduces the computational complexity of encoding octree occupancy symbols as compared to a multi-symbol codec with an alphabet of 256 symbols (e.g. 8 sub-cubes per cube, and each sub-cube occupied or un-occupied 2^8=256). Also the use of context selection based on most probable neighbor configurations may reduce a search for neighbor configurations, as compared to searching all possible neighbor configurations.

In some embodiments, to encode spatial information, occupancy information per cube is encoded as an 8-bit value that may have a value between 0-255. To perform efficient encoding/decoding of such non-binary values, typically a multi-symbol arithmetic encoder/decoder would be used, which is computationally complex and less hardware friendly to implement when compared to a binary arithmetic encoder/decoder. However, direct use of a conventional binary arithmetic encoder/decoder on such a value on the other hand, e.g. encoding each bit independently, may not be as efficient. However, in order, to efficiently encode the non-binary occupancy values with a binary arithmetic encoder an adaptive look up table, as described above, (A-LUT), which keeps track of the N (e.g., 32) most frequent occupancy symbols, may be used along with a cache which keeps track of the last different observed M (e.g., 16) occupancy symbols.

The values for the number of last different observed occupancy symbols M to track and the number of the most frequent occupancy symbols N to track may be defined by a user, such as an engineer customizing the encoding technique for a particular application, or may be chosen based on an offline statistical analysis of encoding sessions. The choice of the values of M and N may be based on a compromise between:

Encoding efficiency,
Computational complexity, and
Memory requirements.

In some embodiments, the algorithm proceeds as follows:
The adaptive look-up table (A-LUT) is initialized with N symbols provided by the user (e.g. engineer) or computed offline based on the statistics of a similar class of point clouds.
The cache is initialized with M symbols provided by the user (e.g. engineer) or computed offline based on the statistics of a similar class of point clouds.
Every time an occupancy symbol S is encoded the following steps are applied
1. A binary information indicating whether S is in the A-LUT or not is encoded.
2. If S is in the A-LUT, the index of S in the A-LUT is encoded by using a binary arithmetic encoder
Let (b1, b2, b3, b4, b5) be the five bits of the binary representation of the index of S in the A-LUT. Let b1 be the least significant bit and b5 the most significant bit.
Three approaches as described below to encode the index of S may be used, for example by using either 31, 9, or 5 adaptive binary arithmetic contexts as shown below 31 Contexts First encode b5 of the index of S with a first context (call it context 0), when encoding the most significant bit (the first bit to be encoded) there is not any information that can be used from the encoding of other bits, that is why the context is referred to as context zero. Then when encoding b4 (the second bit to be encoded), there are two additional contexts that may be used call them context 1 (if b5=0) and context 2 (if b5=1). When this approach is taken all the way out to b1, there are 31 resulting contexts as shown in the diagram in FIG. 7, context 0-30. This approach exhaustively uses each bit that is encoded to select an adaptive context for encoding the next bit. For example, see FIG. 7.

9 Contexts

Keep in mind that the index values of the adaptive look-up table ALUT are assigned based on how frequently the symbol S has appeared. Thus the most frequent symbol S in the ALUT would have an index value of 0 meaning that all of the bits of the index value for the most frequent symbol S are zero. For example, the smaller the binary value, the more frequently the symbol has appeared. To encode nine contexts, for b4 and b5, which are the most significant bits, if they are 1 s the index value must be comparatively large. For example if b5=1 then the index value is at least 16 or higher, or if b4=1 the index value is at least 8 or higher. So when encoding 9 contexts, focus is placed on the first 7 index entries, for example 1-7. For these 7 index entries adaptive encoding contexts are used. However for index entries with values greater than 7 the same context is used, for example a static binary encoder. Thus, if b5=1 or b4=1, then the same context is used to encode the index value. If not, then one of the adaptive contexts 1-7 is used. Because there is a context 0 for b5, 7 adaptive contexts, and a common context for entries strictly greater than 8, there are nine total contexts. This simplifies encoding and reduces the number of contexts to be communicated as compared to using all 31 contexts as discussed above.

5 contexts

To encode an index value using 5 contexts, determine if b5=1. If b5=1 then use a static binary context to encode all the bits of the index value from b4 to b1. If b5 does not equal 1, then encode b4 of the index value and see if b4 is equal to 1 or 0. If b4=1, which means the index value is higher than 8, then again use the static binary context to encode the bits b3 to b1. This reasoning then repeats, so that if b3=1, the static binary context is used to encode bits b2 to b1, and if b2=1 the static binary context is used to encode bit b1. However, if bits b5, b4, and b3 are equal to zero, then an adaptive binary context is selected to encode bit 2 and bit 1 of the index value.

3. If S is not in the A-LUT, then
   A binary information indicating whether S is in the cache or not is encoded.
   If S is in the cache, then the binary representation of its index (in the cache) is encoded by using a binary arithmetic encoder
      In some embodiments, the binary representation of the index is encoded by using a single static binary context to encode each bit, bit by bit. The bit values are then shifted over by one, where the least significant bit becomes the next more significant bit.
   Otherwise, if S is not in the cache, then the binary representation of S is encoded by using a binary arithmetic encoder
      In some embodiments, the binary representation of S is encoded by using a single adaptive binary context. It is known that the index has a value between 0 and 255, which means it is encoded on 8 bits. The bits are shifted so that the least significant bit becomes the next more significant bit, and a same adaptive context is used to encode all of the remaining bits.
   The symbol S is added to the cache and the oldest symbol in the cache is evicted.
4. The number of occurrences of the symbol S in A-LUT is incremented by one.
5. The list of the N most frequent symbols in the A-LUT is re-computed periodically
   Approach 1: If the number of symbols encoded so far reaches a user-defined threshold (e.g., 64 or 128), then the list of the N most frequent symbols in the A-LUT is re-computed.
   Approach 2: Adapts the update cycle to the number of symbols encoded. The idea is to update the probabilities fast in the beginning and exponentially increase the update cycle with the number of symbols:
      The update cycle updateCycle is initialized to a low number N0 (e.g. 16).
      Every time the number of symbols reaches the update cycle
         the list of the N most frequent symbols in the A-LUT is re-computed
         The update cycle is updated as follows: _updateCycle=min(_alpha*_updateCycle, _maxUpdateCycle)
         _alpha (e.g., 5/4) and maxUpdateCycle (e.g., 1024) are two user-defined parameters, which may control the speed of the exponential growth and the maximum update cycle value.
6. At the start of each level of the octree subdivision, the occurrences of all symbols are reset to zero. The occurrences of the N most frequent symbols are set to 1.
7. When the occurrence of a symbol reaches a user-defined maximum number (e.g., _maxOccurence=1024), the occurrences of all the symbols are divided by 2 to keep the occurrences within a user-defined range.

In some embodiments, a ring-buffer is used to keep track of the elements in the cache. The element to be evicted from the cache corresponds to the position index0=(_last++) % CacheSize, where _last is a counter initialized to 0 and incremented every time a symbol is added to the cache. In some embodiments, the cache could also be implemented with an ordered list, which would guarantee that every time the oldest symbol is evicted.

2. Look-Ahead to Determine Neighbors

In some embodiments, at each level of subdivision of the octree, cubes of the same size are subdivided and an occupancy code for each one is encoded.
   For subdivision level 0, there may be a single cube of $(2^C, 2^C, 2^C)$ without any neighbors.
   For subdivision level 1, there may be up to 8 cubes of dimension $(2^{C-L}, 2^{C-L}, 2^{C-L})$ each.
   . . .
   For subdivision level L, there may be up to $8^L$ cubes of dimension $(2^{C-L}, 2^{C-L}, 2^{C-L})$ each.

In some embodiments, at each level L, a set of non-overlapping look-ahead cubes of dimension (2H-C+L,2H-C+L,2H-C+L) each may be defined, as shown in FIG. 3B. Note that the look-ahead cube can fit 23×H cubes of size (2C-L,2C-L,2C-L).
   At each level L, the cubes contained in each look-ahead cube are encoded without referencing cubes in other look-ahead cubes.
      During the look-ahead phase, the cubes of dimension $(2^{C-L}, 2^{C-L}, 2^{C-L})$ in the current look-ahead cube are extracted from the FIFO and a look-up table that describes for each $(2^{C-L}, 2^{C-L}, 2^{C-L})$ region of the current look-ahead cube whether it is occupied or empty is filled.
      Once, the look-up table is filled, the encode phase for the extracted cubes begins. Here, the occupancy information for the 6 neighbors is obtained by fetching the information directly from the look up table.
      For cubes on the boundary of the look-ahead cube, the neighbors located outside are assumed to be empty.
         Another alternative could consist in filling the values of the outside neighbors based on extrapolation methods.
      Efficient implementation could be achieved by
         Storing the occupancy information of each group of 8 neighboring $(2^{C-L}, 2^{C-L}, 2^{C-L})$ regions on one byte
         Storing the occupancy bytes in a Z-order to maximize memory cache hits 3. Context Selection In some embodiments, to reduce the number of encoding contexts (NC) to a lower number of contexts (e.g., reduced from 10 to 6), a separate context is assigned to each of the (NC-1) most probable neighborhood configurations, and the contexts corresponding to the least probable neighborhood configurations are made to share the same context(s). This is done as follows:
   Before starting the encoding process, initialize the occurrences of the 10 neighborhood configurations (e.g. the 10 configurations shown in FIG. 3A):
      Set all 10 occurrences to 0
      Set the occurrences based on offline/online statistics or based on user-provided information.
   At the beginning of each subdivision level of the octree:
      Determine the (NC-1) most probable neighborhood configurations based on the statistics collected during the encoding of the previous subdivision level.
      Compute a look-up table NLUT, which maps the indexes of the (NC-1) most probable neighborhood configurations to the numbers 0, 1, . . . , (NC-2) and maps the indexes of the remaining configurations to NC-1.
      Initialize the occurrences of the 10 neighborhood configurations to 0.

During the encoding:
Increment the occurrence of a neighborhood configuration by one each time such a configuration is encountered.
Use the look-up table NLUT[ ] to determine the context to use to encode the current occupancy values based on the neighborhood configuration index.

Figure 9A:
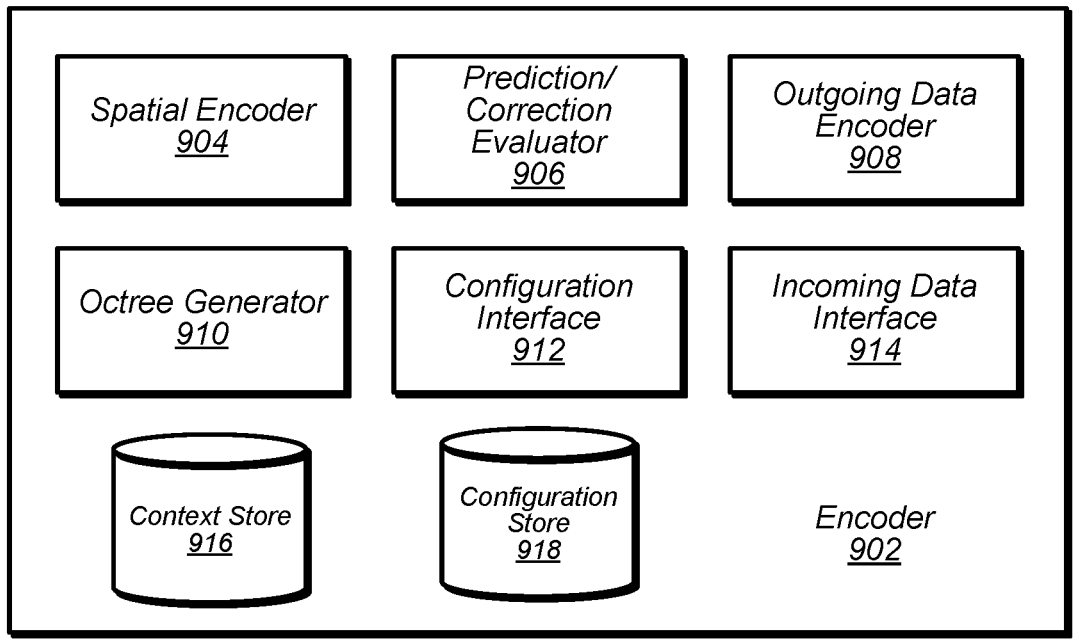
FIG. 9A illustrates components of an encoder, according to some embodiments.

FIG. 9A illustrates components of an encoder, according to some embodiments.

Encoder 902 may be a similar encoder as encoder 104 illustrated in FIG. 1A. Encoder 902 includes spatial encoder 904, octree tree generator 910, prediction/correction evaluator 906, incoming data interface 914, and outgoing data encoder 908. Encoder 902 also includes context store 916 and configuration store 918.

In some embodiments, a spatial encoder, such as spatial encoder 904, may compress spatial information associated with points of a point cloud, such that the spatial information can be stored or transmitted in a compressed format. In some embodiments, a spatial encoder, such as spatial encoder 904, may utilize octrees to compress spatial information for points of a point cloud as discussed in more detail herein.

In some embodiments, compressed spatial information may be stored or transmitted with compressed attribute information or may be stored or transmitted separately. In either case, a decoder receiving compressed attribute information for points of a point cloud may also receive compressed spatial information for the points of the point cloud, or may otherwise obtain the spatial information for the points of the point cloud.

An octree generator, such as octree generator 910, may utilize spatial information for points of a point cloud to generate an octree that subdivides a point cloud into cubes and sub-cubes.

A prediction/correction evaluator, such as prediction/correction evaluator 906 of encoder 902, may determine predicted attribute values for points of a point cloud based on an inverse distance interpolation method using attribute values of the K-nearest neighboring points of a point for whom an attribute value is being predicted. The prediction/correction evaluator may also compare a predicted attribute value of a point being evaluated to an original attribute value of the point in a non-compressed point cloud to determine an attribute correction value. In some embodiments, a prediction/correction evaluator, such as prediction/correction evaluator 906 of encoder, 902 may adaptively adjust a prediction strategy used to predict attribute values of points in a given neighborhood of points based on a measurement of the variability of the attribute values of the points in the neighborhood.

An outgoing data encoder, such as outgoing data encoder 908 of encoder 902, may encode attribute correction values and assigned attribute values included in a compressed attribute information file for a point cloud. In some embodiments, an outgoing data encoder, such as outgoing data encoder 908, may select an encoding context for encoding a value, such as an assigned attribute value or an attribute correction value, based on a number of symbols included in the value. In some embodiments, values with more symbols may be encoded using an encoding context comprising Golomb exponential encoding, whereas values with fewer symbols may be encoded using arithmetic encoding. In some embodiments, encoding contexts may include more than one encoding technique. For example, a portion of a value may be encoded using arithmetic encoding while another portion of the value may be encoded using Golomb exponential encoding. In some embodiments, an encoder, such as encoder 902, may include a context store, such as context store 916, that stores encoding contexts used by an outgoing data encoder, such as outgoing data encoder 908, to encode attribute correction values and assigned attribute values.

In some embodiments, an encoder, such as encoder 902, may also include an incoming data interface, such as incoming data interface 914. In some embodiments, an encoder may receive incoming data from one or more sensors that capture points of a point cloud or that capture attribute information to be associated with points of a point cloud. For example, in some embodiments, an encoder may receive data from an LIDAR system, 3-D-camera, 3-D scanner, etc. and may also receive data from other sensors, such as a gyroscope, accelerometer, etc. Additionally, an encoder may receive other data such as a current time from a system clock, etc. In some embodiments, such different types of data may be received by an encoder via an incoming data interface, such as incoming data interface 914 of encoder 902.

In some embodiments, an encoder, such as encoder 902, may further include a configuration interface, such as configuration interface 912, wherein one or more parameters used by the encoder to compress a point cloud may be adjusted via the configuration interface. In some embodiments, a configuration interface, such as configuration interface 912, may be a programmatic interface, such as an API. Configurations used by an encoder, such as encoder 902, may be stored in a configuration store, such as configuration store 918.

In some embodiments, an encoder, such as encoder 902, may include more or fewer components than shown in FIG. 9A.

Figure 9B:
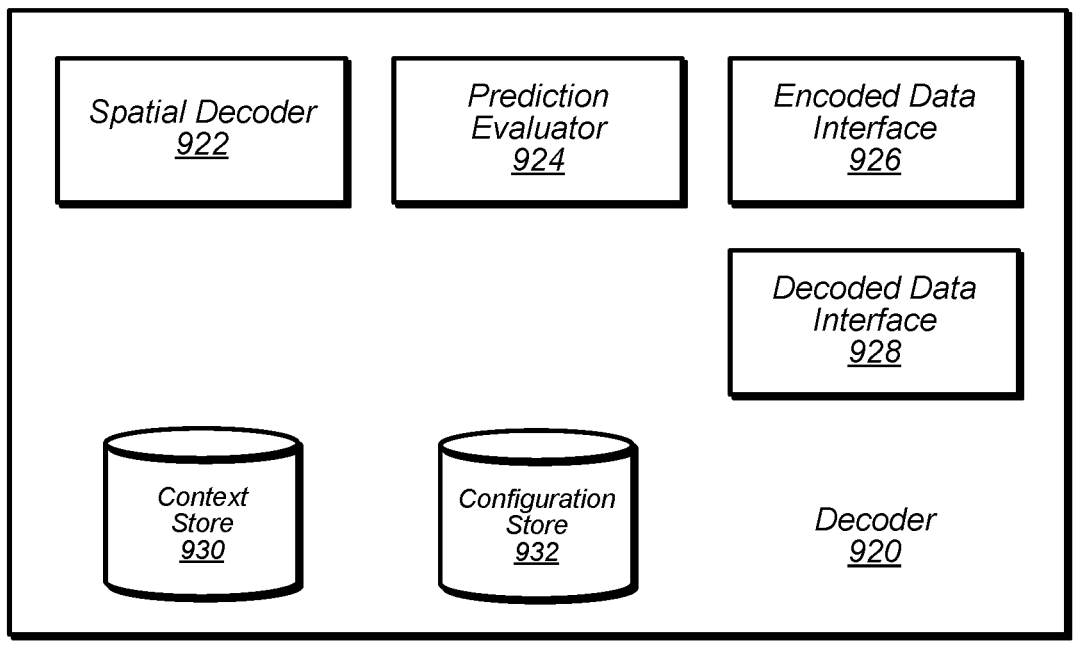
FIG. 9B illustrates components of a decoder, according to some embodiments.

FIG. 9B illustrates components of a decoder, according to some embodiments.

Decoder 920 may be a similar decoder as decoder 116 illustrated in FIG. 1A. Decoder 920 includes encoded data interface 926, spatial decoder 922, prediction evaluator 924, context store 930, configuration store 932, and decoded data interface 928.

A decoder, such as decoder 920, may receive an encoded compressed point cloud and/or an encoded compressed attribute information file for points of a point cloud. For example, a decoder, such as decoder 920, may receive a compressed attribute information file and/or a compressed spatial information file. The compressed attribute information file and/or compressed spatial information file may be received by a decoder via an encoded data interface, such as encoded data interface 926. The encoded compressed point cloud may be used by the decoder to determine spatial information for points of the point cloud. For example, spatial information of points of a point cloud included in a compressed point cloud may be generated by a spatial decoder, such as spatial decoder 922. In some embodiments, a compressed point cloud may be received via an encoded data interface, such as encoded data interface 926, from a storage device or other intermediary source, wherein the compressed point cloud was previously encoded by an encoder, such as encoder 104. In some embodiments, an encoded data interface, such as encoded data interface 926, may decode spatial information. For example the spatial information may have been encoded using various encoding techniques as described herein.

A prediction evaluator of a decoder, such as prediction evaluator 924, may select a starting point of a minimum spanning tree based on an assigned starting point included in a compressed attribute information file. In some embodiments, the compressed attribute information file may include one or more assigned values for one or more corresponding attributes of the starting point. In some embodiments, a prediction evaluator, such as prediction evaluator 924, may assign values to one or more attributes of a starting point in a decompressed model of a point cloud being decompressed based on assigned values for the starting point included in a compressed attribute information file. A prediction evaluator, such as prediction evaluator 924, may further utilize the assigned values of the attributes of the starting point to determine attribute values of neighboring points. For example, a prediction evaluator may select a next nearest neighboring point to the starting point as a next point to evaluate, wherein the next nearest neighboring point is selected based on a shortest distance to a neighboring point from the starting point in the minimum spanning tree. Note that because the minimum spanning tree is generated based on the same or similar spatial information at the decoder as was used to generate a minimum spanning tree at an encoder, the decoder may determine the same evaluation order for evaluating the points of the point cloud being decompressed as was determined at the encoder by identifying next nearest neighbors in the minimum spanning tree.

A decoder, such as decoder 920, may provide a decompressed point cloud generated based on a received compressed point cloud and/or a received compressed attribute information file to a receiving device or application via a decoded data interface, such as decoded data interface 928. The decompressed point cloud may include the points of the point cloud and attribute values for attributes of the points of the point cloud. In some embodiments, a decoder may decode some attribute values for attributes of a point cloud without decoding other attribute values for other attributes of a point cloud. For example, a point cloud may include color attributes for points of the point cloud and may also include other attributes for the points of the point cloud, such as velocity, for example. In such a situation, a decoder may decode one or more attributes of the points of the point cloud, such as the velocity attribute, without decoding other attributes of the points of the point cloud, such as the color attributes.

In some embodiments, the decompressed point cloud and/or decompressed attribute information file may be used to generate a visual display, such as for a head mounted display. Also, in some embodiments, the decompressed point cloud and/or decompressed attribute information file may be provided to a decision making engine that uses the decompressed point cloud and/or decompressed attribute information file to make one or more control decisions. In some embodiments, the decompressed point cloud and/or decompressed attribute information file may be used in various other applications or for various other purposes.

Exampled Applications for Point Cloud Compression and Decompression

Figure 10:
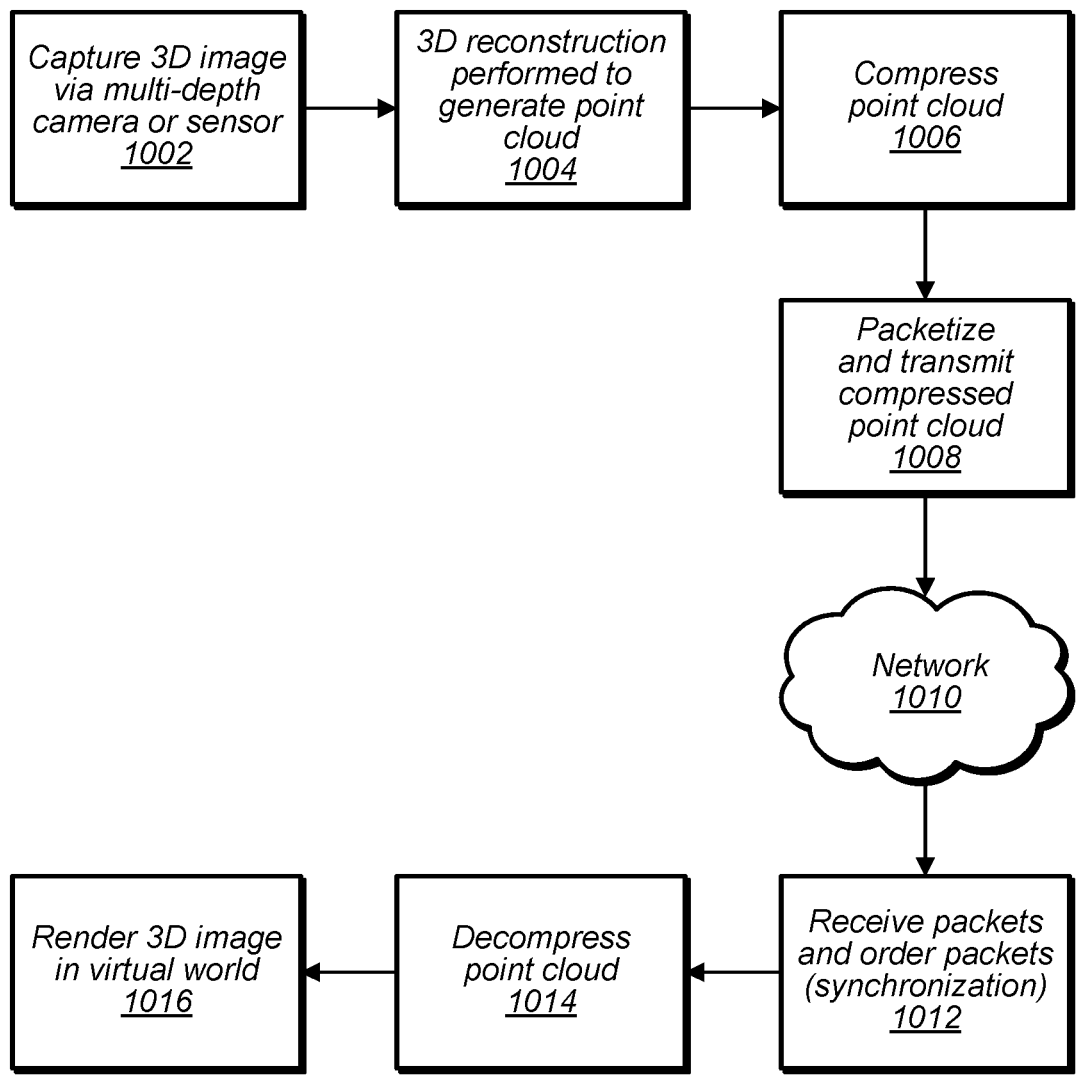
FIG. 10 illustrates compressed point cloud information being used in a 3-D telepresence application, according to some embodiments.

FIG. 10 illustrates compressed point clouds being used in a 3-D telepresence application, according to some embodiments.

In some embodiments, a sensor, such as sensor 102, an encoder, such as encoder 104 or encoder 202, and a decoder, such as decoder 116 or decoder 220, may be used to communicate point clouds in a 3-D telepresence application. For example, a sensor, such as sensor 102, at 1002 may capture a 3D image and at 1004, the sensor or a processor associated with the sensor may perform a 3D reconstruction based on sensed data to generate a point cloud.

At 1006, an encoder such as encoder 104 or 202 may compress the point cloud and at 1008 the encoder or a post processor may packetize and transmit the compressed point cloud, via a network 1010. At 1012, the packets may be received at a destination location that includes a decoder, such as decoder 116 or decoder 220. The decoder may decompress the point cloud at 1014 and the decompressed point cloud may be rendered at 1016. In some embodiments a 3-D telepresence application may transmit point cloud data in real time such that a display at 1016 represents images being observed at 1002. For example, a camera in a canyon may allow a remote user to experience walking through a virtual canyon at 1016.

Figure 11:
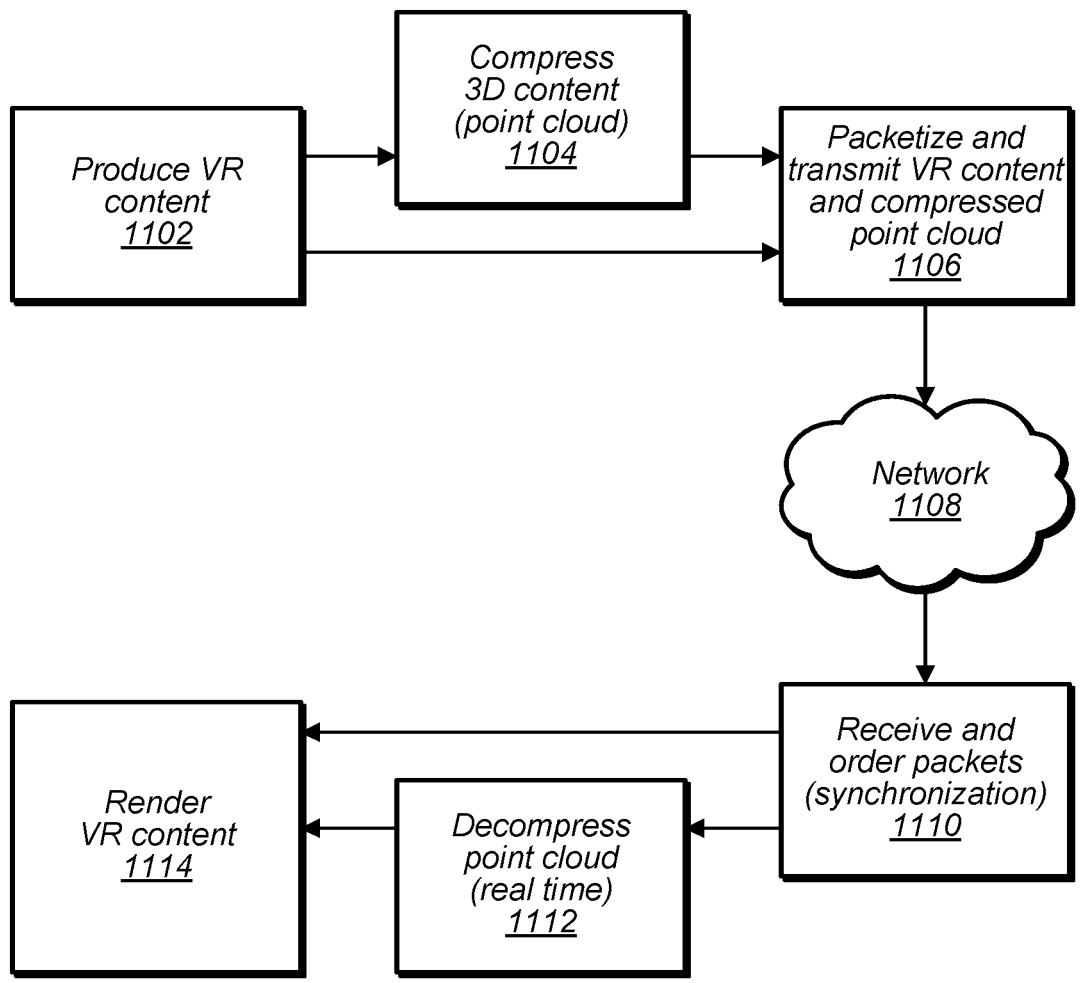
FIG. 11 illustrates compressed point cloud information being used in a virtual reality application, according to some embodiments.

FIG. 11 illustrates compressed point clouds being used in a virtual reality (VR) or augmented reality (AR) application, according to some embodiments.

In some embodiments, point clouds may be generated in software (for example as opposed to being captured by a sensor). For example, at 1102 virtual reality or augmented reality content is produced. The virtual reality or augmented reality content may include point cloud data and non-point cloud data. For example, a non-point cloud character may traverse a landscape represented by point clouds, as one example. At 1104, the point cloud data may be compressed and at 1106 the compressed point cloud data and non-point cloud data may be packetized and transmitted via a network 1108. For example, the virtual reality or augmented reality content produced at 1102 may be produced at a remote server and communicated to a VR or AR content consumer via network 1108. At 1110, the packets may be received and synchronized at the VR or AR consumer's device. A decoder operating at the VR or AR consumer's device may decompress the compressed point cloud at 1112 and the point cloud and non-point cloud data may be rendered in real time, for example in a head mounted display of the VR or AR consumer's device. In some embodiments, point cloud data may be generated, compressed, decompressed, and rendered responsive to the VR or AR consumer manipulating the head mounted display to look in different directions.

In some embodiments, point cloud compression as described herein may be used in various other applications, such as geographic information systems, sports replay broadcasting, museum displays, autonomous navigation, etc.

Example Computer System

Figure 12:
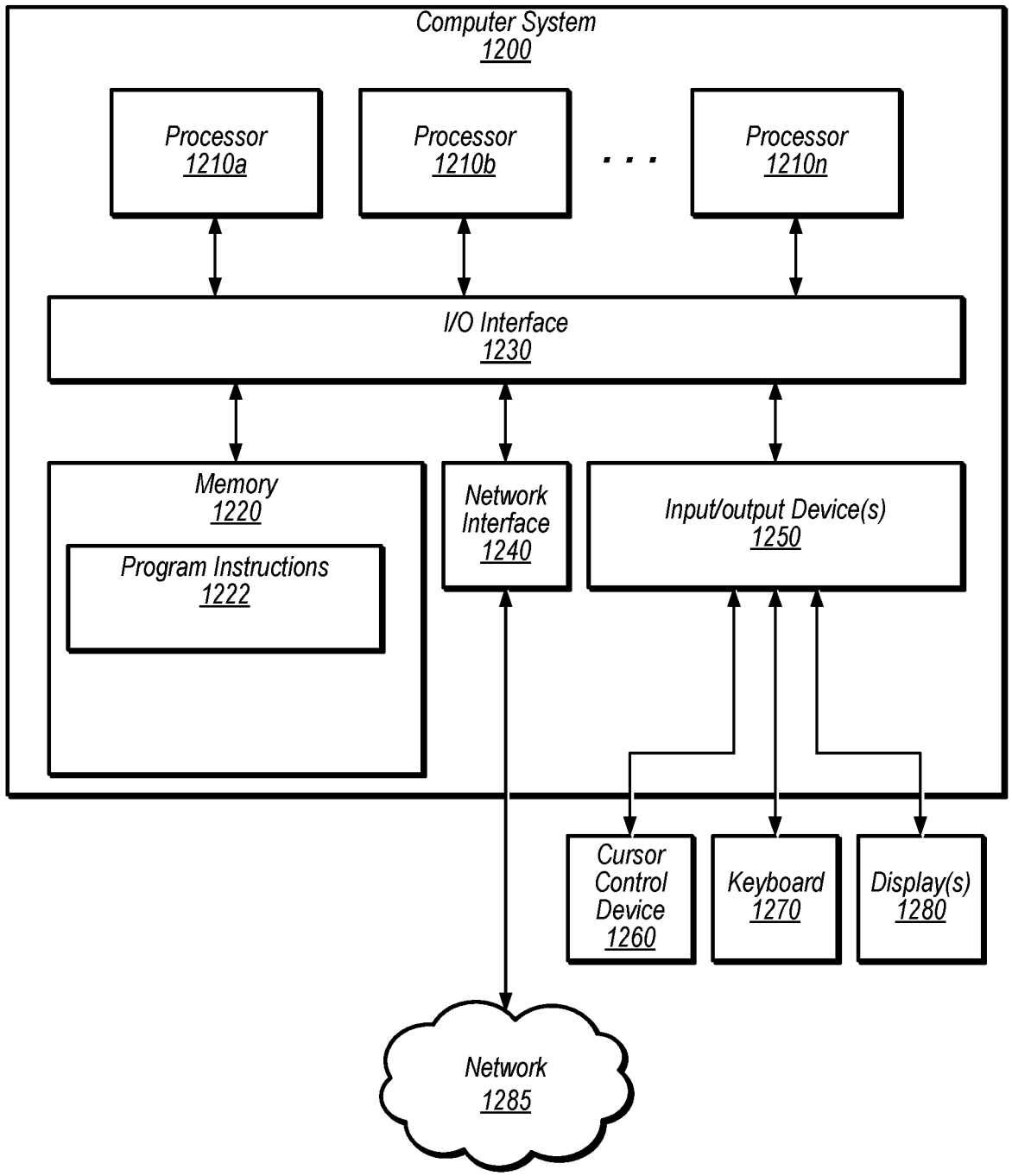
FIG. 12 illustrates an example computer system that may implement an encoder or decoder, according to some embodiments.

FIG. 12 illustrates an example computer system 1200 that may implement an encoder or decoder or any other ones of the components described herein, (e.g., any of the components described above with reference to FIGS. 1-11), in accordance with some embodiments. The computer system 1200 may be configured to execute any or all of the embodiments described above. In different embodiments, computer system 1200 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a point cloud encoder or decoder, as described herein may be executed in one or more computer systems 1200, which may interact with various other devices. Note that any component, action, or functionality described above with respect to FIGS. 1-11 may be implemented on one or more computers configured as computer system 1200 of FIG. 12, according to various embodiments. In the illustrated embodiment, computer system 1200 includes one or more processors 1210 coupled to a system memory 1220 via an input/output (I/O) interface 1230. Computer system 1200 further includes a network interface 1240 coupled to I/O interface 1230, and one or more input/output devices 1250, such as cursor control device 1260, keyboard 1270, and display(s) 1280. In some cases, it is contemplated that embodiments may be implemented using a single instance of computer system 1200, while in other embodiments multiple such systems, or multiple nodes making up computer system 1200, may be configured to host different portions or instances of embodiments. For example, in one embodiment some elements may be implemented via one or more nodes of computer system 1200 that are distinct from those nodes implementing other elements.

In various embodiments, computer system 1200 may be a uniprocessor system including one processor 1210, or a multiprocessor system including several processors 1210 (e.g., two, four, eight, or another suitable number). Processors 1210 may be any suitable processor capable of executing instructions. For example, in various embodiments processors 1210 may be general-purpose or embedded processors implementing any of a variety of instruction set architectures (ISAs), such as the x86, PowerPC, SPARC, or MIPS ISAs, or any other suitable ISA. In multiprocessor systems, each of processors 1210 may commonly, but not necessarily, implement the same ISA.

System memory 1220 may be configured to store point cloud compression or point cloud decompression program instructions 1222 and/or sensor data accessible by processor 1210. In various embodiments, system memory 1220 may be implemented using any suitable memory technology, such as static random access memory (SRAM), synchronous dynamic RAM (SDRAM), nonvolatile/Flash-type memory, or any other type of memory. In the illustrated embodiment, program instructions 1222 may be configured to implement an image sensor control application incorporating any of the functionality described above. In some embodiments, program instructions and/or data may be received, sent or stored upon different types of computer-accessible media or on similar media separate from system memory 1220 or computer system 1200. While computer system 1200 is described as implementing the functionality of functional blocks of previous Figures, any of the functionality described herein may be implemented via such a computer system.

In one embodiment, I/O interface 1230 may be configured to coordinate I/O traffic between processor 1210, system memory 1220, and any peripheral devices in the device, including network interface 1240 or other peripheral interfaces, such as input/output devices 1250. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computer system 1200 and other devices attached to a network 1285 (e.g., carrier or agent devices) or between nodes of computer system 1200. Network 1285 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1240 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1250 may, in some embodiments, include one or more display terminals, keyboards, keypads, touchpads, scanning devices, voice or optical recognition devices, or any other devices suitable for entering or accessing data by one or more computer systems 1200. Multiple input/output devices 1250 may be present in computer system 1200 or may be distributed on various nodes of computer system 1200. In some embodiments, similar input/output devices may be separate from computer system 1200 and may interact with one or more nodes of computer system 1200 through a wired or wireless connection, such as over network interface 1240.

As shown in FIG. 12, memory 1220 may include program instructions 1222, which may be processor-executable to implement any element or action described above. In one embodiment, the program instructions may implement the methods described above. In other embodiments, different elements and data may be included. Note that data may include any data or information described above.

Those skilled in the art will appreciate that computer system 1200 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1200 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1200 may be transmitted to computer system 1200 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. One or more non-transitory, computer-readable storage media, storing program instructions that, when executed using one or more computing devices, cause the one or more computing devices to:
   decode encoded representations of occupancy symbols for a set of cubes of an octree,
   wherein to decode a representation of one of the occupancy symbols, the program instructions, when executed using the one or more computing devices, cause the one or more computing devices to:
   determine whether a first bit is set in the encoded representation indicating that the occupancy symbol is included in a look-up table,
   wherein if the first bit indicates the occupancy symbol is included in the look-up table, the occupancy symbol is read from the look-up table based on an index value indicated in one or more additional bits of the encoded representation, wherein the index value corresponds to the occupancy symbol in the look-up table;
   determine, if the first bit is not set, whether another bit is set in the encoded representation indicating that the occupancy symbol is included in a cache,
   wherein if the other bit indicates the occupancy symbol is included in the cache, the occupancy symbol is read from the cache based on an index value indicated in one or more additional bits of the encoded representation, wherein the index value corresponds to the occupancy symbol in the cache; and
   otherwise decode a binary representation of the occupancy symbol indicated in the encoded representation.

2. The one or more non-transitory computer readable media of claim 1, wherein the index value for the look-up table or the index value for the cache are encoded in the encoded representation using fewer bits than are used to encode the binary representation of the occupancy symbol.

3. The one or more non-transitory computer readable media of claim 1, wherein:
   the index value corresponding to the index of the look-up table comprises a five-bit value;
   the index value corresponding to the index of the cache comprises a four-bit value; and
   the binary representation comprises an eight-bit value.

4. The one or more non-transitory computer readable media of claim 1, wherein to decode the occupancy symbols for the cubes of the octree, the program instructions, when executed using the one or more computing devices, further cause the one or more computing device to:
   decode a first occupancy symbol for a first cube of the octree via a first arithmetic decoder; and
   decode, in parallel with the first occupancy symbol, one or more additional occupancy symbols for one or more additional cubes of the octree via a plurality of additional arithmetic decoders.

5. The one or more non-transitory computer readable media of claim 1, wherein the program instructions, when executed using the one or more computing devices, further cause the one or more computing device to:
   receive a bit stream for the octree comprising the encoded representations of the occupancy symbols wherein the encoded representations of the occupancy symbols comprise for respective ones of the encoded representations of the occupancy symbols a look-up table index value, a cache index value, or a binary representation.

6. The one or more non-transitory computer readable media of claim 5, wherein the bit stream further comprises, for respective sets of the encoded representations of the occupancy symbols, respective indications of selected encoding contexts to be used to decode the respective sets of encoded representations of the occupancy symbols.

7. A device, comprising:
   a memory storing program instructions; and
   one or more processors,
   wherein the program instructions, when executed using the one or more processors, cause the one or more processors to:
   determine whether a first bit of an encoded occupancy symbol is set indicating that the occupancy symbol is included in a look-up table,
   wherein if the first bit indicates the occupancy symbol is included in the look-up table, the occupancy symbol is read from the look-up table based on an index value included in the encoded occupancy symbol, wherein the index value corresponds to the occupancy symbol in the look-up table;
   determine, if the first bit is not set, whether another bit is set indicating that the occupancy symbol is included in a cache, wherein if the other bit indicates the occupancy symbol is included in the cache, the occupancy symbol is read from the cache based on an index value included in the encoded occupancy symbol, wherein the index value corresponds to the occupancy symbol in the cache; and otherwise decode a binary representation of the occupancy symbol included in the encoded occupancy symbol.

8. The device of claim 7, wherein the index value included in the encoded occupancy symbol for the look-up table or the index value included in the encoded occupancy symbol for the cache are encoded using fewer bits than are used to encode the binary representation for the occupancy symbol.

9. The device of claim 8, wherein the cache is implemented in the memory or another memory of the device, wherein the cache includes index values and corresponding occupancy symbols for a set of recently decoded occupancy symbols.

10. The device of claim 9, wherein the look-up table is implemented in the memory or another memory of the device, wherein the look-up table includes index values and corresponding occupancy symbols for a set of frequently decoded occupancy symbols.

11. The device of claim 10, wherein the look-up table comprises more entries and associated index values than are included in the cache, and wherein the index values for entries in the cache are expressed using shorter bit-length values than are used to express index values for entries in the look-up table.

12. The device of claim 10, wherein the program instructions, when executed using the one or more processors, further cause the one or more processors to:
initialize counters for respective ones of the occupancy symbols; and
increment a respective one of the counters when decoding a given encoded occupancy symbol matching a respective occupancy symbol for the respective counter,
wherein the set of frequently decoded occupancy symbols included in the look-up table comprises occupancy symbols selected based on counts of the respective counters for the respective occupancy symbols.

13. The device of claim 7, wherein the program instructions, when executed using the one or more processors, further cause the one or more processors to implement:
receiving a bit stream comprising:
the encoded occupancy symbols; and
neighborhood encoding contexts to be used in decoding the encoded occupancy symbols,
wherein for separate ones of the neighborhood encoding contexts, separate look-up tables and separate caches are maintained for decoding encoded occupancy symbols using respective ones of the neighborhood encoding contexts.

14. The device of claim 13, wherein to determine a given neighborhood encoding context to be used to decode a set of encoded occupancy symbols, the program instructions, when executed using the one or more processors, cause the one or more processors to:
determine whether a first bit of an encoded value for the given neighborhood encoding context is set indicating that the given neighborhood encoding context is included in a neighborhood encoding context look-up table,
wherein if the first bit indicates the given neighborhood encoding context is included in the neighborhood encoding context look-up table, the given neighborhood encoding context is read from the neighborhood encoding context look-up table based on an index value included in the bit stream for the given neighborhood encoding context, wherein the index value corresponds to the given neighborhood encoding context in the neighborhood encoding context look-up table;
use a particular encoded occupancy symbol look-up table and/or a particular cache, corresponding to the given neighborhood encoding context that was read from the neighborhood encoding context look-up table, to decode the set of encoded occupancy symbols corresponding to the given neighborhood encoding context; and
otherwise use a shared occupancy symbol look-up table and/or a shared cache to decode the set of encoded occupancy symbols corresponding to the given neighborhood encoding context, wherein the shared occupancy symbol look-up table and the shared cache are applicable to one or more neighborhood encoding contexts not included in the neighborhood encoding context look-up table.

15. One or more non-transitory, computer-readable storage media, storing program instructions that, when executed using one or more computing devices, cause the one or more computing devices to:
encode occupancy symbols for an octree, wherein:
a first binary information is encoded if a given occupancy symbol being encoded is included in a look-up table for the occupancy symbols, wherein the first binary information includes an index value into the look-up table for the given occupancy symbol, and wherein the look-up table includes a sub-set of frequently encoded occupancy symbols of a set of possible occupancy symbols for a set of cubes at a given octree level of the octree;
a second binary information is encoded if the given occupancy symbol is not included in the look-up table, but is included in a cache, wherein the second binary information includes an index value into the cache for the given occupancy symbol, wherein the cache includes another sub-set of recently encoded occupancy symbols of the set of possible occupancy symbols for the set of cubes at the given octree level; and
a binary representation of the given occupancy symbol is encoded if the given occupancy symbol is not included in the look-up table or the cache.

16. The one or more non-transitory computer readable media of claim 15, wherein:
the binary representation of the given occupancy symbol comprises an 8-bit binary value, and
the first binary information for the index value in the look-up table comprises fewer bits than the 8-bit binary value encoded for the binary representation.

17. The one or more non-transitory computer readable media of claim 16, wherein:
the second binary information for the index value in the cache comprises fewer bits than are used to encode the first binary information for the index value in the look-up table.

18. The one or more non-transitory computer readable media of claim 15, wherein the program instructions, when executed using the one or more computing devices, further cause the one or more computing devices to:
generate a neighborhood look-up table for a look-ahead cube that includes a given cube as a sub-cube of the look-ahead cube, wherein the neighborhood look-up table is populated with values indicating whether sub-cubes of the look-ahead cube are populated with points or are un-populated, and wherein the neighborhood look-ahead table is populated without referencing sub-cubes of other cubes at a same level of the octree as the look-ahead cube; and select a particular neighborhood encoding context for encoding an occupancy symbol for the given cube included in the look-ahead cube based on neighborhood occupancy configurations of neighboring cubes of the given cube at the given octree level as indicated in the neighborhood look-up table, wherein for respective ones of the neighborhood encoding contexts, an encoder supports a separate look-ahead table and a separate cache.

19. The one or more non-transitory computer readable media of claim 18, wherein the neighborhood encoding contexts used to encode the occupancy symbols comprise at least one neighborhood encoding context that corresponds to more than one neighborhood occupancy configuration, wherein more frequently occurring neighborhood occupancy configurations are assigned separate neighborhood encoding contexts and two or more less frequently occurring neighborhood occupancy configurations share a common neighborhood encoding context.

20. The one or more non-transitory computer readable media of claim 15, wherein the program instructions, when executed using the one or more computing devices, further cause the one or more computing devices to:

initialize the look-up table for the given octree level with a given sub-set of occupancy symbols of a set of possible occupancy symbols at the given octree level and initialize the look-up table with corresponding index values for the given sub-set of occupancy symbols;

initialize, for the given octree level, counters for respective ones of the occupancy symbols of the set of possible occupancy symbols; and increment a respective one of the counters for each respective occupancy symbol of the set of possible occupancy symbols when encoding a given occupancy symbol matching the respective occupancy symbol of the set of possible occupancy symbols.

* * * * *